United States Patent
Sakdeo et al.

(10) Patent No.: US 10,678,653 B2
(45) Date of Patent: *Jun. 9, 2020

(54) RECOVERY OF IN-MEMORY STATE IN A LOG-STRUCTURED FILESYSTEM USING FUZZY CHECKPOINTS

(71) Applicant: Tintri by DDN, Inc., Santa Clara, CA (US)

(72) Inventors: Sumedh V. Sakdeo, San Jose, CA (US); Brandon W. Salmon, Menlo Park, CA (US); Olivier F. Lecomte, Sunnyvale, CA (US); Marco J. Zagha, Belmont, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,248

(22) Filed: Oct. 4, 2018

(65) Prior Publication Data

US 2019/0129803 A1 May 2, 2019

Related U.S. Application Data

(63) Continuation of application No. 14/594,479, filed on Jan. 12, 2015, now Pat. No. 10,133,638.

(60) Provisional application No. 61/926,674, filed on Jan. 13, 2014.

(51) Int. Cl.
*G06F 11/14* (2006.01)
*G06F 16/18* (2019.01)
*G06F 16/11* (2019.01)

(52) U.S. Cl.
CPC ...... *G06F 11/1451* (2013.01); *G06F 11/1402* (2013.01); *G06F 16/11* (2019.01); *G06F 16/1865* (2019.01); *G06F 2201/84* (2013.01)

(58) Field of Classification Search
CPC ...................................................... G06F 16/11
See application file for complete search history.

(56) References Cited

U.S. PATENT DOCUMENTS

| | | | | |
|---|---|---|---|---|
| 5,317,752 A | * | 5/1994 | Jewett | G06F 1/12 714/14 |
| 5,933,593 A | * | 8/1999 | Arun | G06F 11/1451 711/126 |
| 2004/0039891 A1 | | 2/2004 | Leung | |
| 2006/0085679 A1 | * | 4/2006 | Neary | G06F 11/1482 714/13 |
| 2011/0173488 A1 | * | 7/2011 | Blumrich | G06F 11/1438 714/4.1 |

(Continued)

*Primary Examiner* — Charles E Lu
(74) *Attorney, Agent, or Firm* — Van Pelt, Yi & James LLP

(57) ABSTRACT

Recovery of an in-memory state in a log-structured filesystem using fuzzy checkpoints is disclosed, including: determining a portion of a data structure to checkpoint to a storage unit, wherein the structure is associated with a set of references to locations in persistent storage at which metadata is stored, wherein the portion of the data structure is dynamically determined based at least in part on a size of the data structure and a predetermined number of storage units to be associated with a checkpoint window, wherein the number of storage units to be associated with the checkpoint window is fewer than a total number of storage units associated with the persistent storage; and checkpointing the portion of the data structure to the storage unit.

20 Claims, 18 Drawing Sheets

(56) References Cited

U.S. PATENT DOCUMENTS

2013/0332660 A1* 12/2013 Talagala .............. G06F 12/0246
  711/103
2013/0339573 A1    12/2013 Anderson

* cited by examiner

Metadata Object Descriptor Table 400

| Page ID | Flash Location | Version |
|---|---|---|
| 0 | F100001 | 2 |
| 1 | F100052 | 1 |
| 2 | F106812 | 2 |
| 3 | F112301 | 7 |
| 4 | F186136 | 6 |
| 5 | F104523 | 4 |
| ... | ... | ... |

| Logical Segment Sequence Number | Time of Modification |
|---|---|
| 116 | 12-7-2015_21:30 |
| 115 | 12-7-2015_18:32 |
| 114 | 12-7-2015_16:02 |
| 113 | 12-7-2015_15:36 |
| 112 | 12-7-2015_10:23 |
| 111 | 12-7-2015_9:08 |
| 110 | 12-7-2015_8:57 |
| 109 | 12-7-2015_5:45 |
| 108 | 12-7-2015_4:23 |
| 107 | 12-7-2015_2:08 |
| 106 | 12-7-2015_1:27 |
| 105 | 12-6-2015_23:22 |
| 104 | 12-6-2015_20:46 |
| 103 | 12-6-2015_18:54 |
| ... | ... |

- Last Persisted Segment → 116
- Current Checkpoint Window: 116–112
- Segment at the head of the Current Checkpoint Window → 111
- Last Stable Checkpoint Window: 110–104
- Segment at the head of the Last Stable Checkpoint Window → 103

Time ↑

FIG. 6

RECOVERY OF IN-MEMORY STATE IN A LOG-STRUCTURED FILESYSTEM USING FUZZY CHECKPOINTS

CROSS REFERENCE TO OTHER APPLICATIONS

This application is a continuation of co-pending U.S. patent application Ser. No. 14/594,479, entitled RECOVERY OF IN-MEMORY STATE IN A LOG-STRUCTURED FILESYSTEM USING FUZZY CHECKPOINTS filed Jan. 12, 2015, which claims priority to U.S. Provisional Patent Application No. 61/926,674, entitled CONSTANT-TIME RECOVERY OF IN-MEMORY STATE IN A LOG-STRUCTURED FILESYSTEM USING SELF-THROTTLED FUZZY CHECKPOINTS filed Jan. 13, 2014 both of which are incorporated herein by reference for all purposes.

BACKGROUND OF THE INVENTION

With modern filesystems, a large amount of state must be held or cached in memory in order to provide good performance and implement sophisticated storage management features. Quickly recovering and loading this state back into memory is important when the filesystem starts up, recovers from a crash, and for certain types of failover operations. As filesystems become larger and more complex, the amount of in-memory state increases and the amount of on-disk state that may need to be scanned to recover the in-memory state becomes larger. Very quickly, scanning large amounts of on-disk state in order to discover and recover the needed in-memory state may become unacceptably slow.

In some systems, most if not all of the metadata in a hybrid filesystem is stored in a particular type of persistent, underlying storage. For example, the metadata in the hybrid filesystem can be stored on solid-state disk (SSD) drives. Specifically, for example, the SSD storage comprises flash storage. The total flash space may be different on each model and generally increases each year as new larger and higher performance models are introduced. Conventionally, metadata state data related to the metadata is stored in a memory or some other type of non-persistent (e.g., temporary) storage. However, when the system crashes or is rebooted, the metadata state data in the memory is lost.

Upon restart or reboot of the system, the metadata state data associated with the system's metadata should be rebuilt in the memory. Conventionally, in some systems, the amount of (e.g., flash) storage to scan to discover the needed metadata was proportional to the size of the flash storage. Put another way, a substantial portion of the flash storage is typically scanned to discover the needed metadata. The metadata is discovered so that the metadata state data related to the metadata can be rebuilt in memory. However, with the increasing size of flash storage on a system, the total time that is needed to scan the flash storage for discovering metadata objects may become too long and is in danger of exceeding a predetermined upper bound limit on the time to perform startup.

Furthermore, in some systems, a log-structured filesystem is used. In a log-structured filesystem, objects are written to the filesystem in an append-only fashion, meaning that old versions of an object are not modified (but rather persist until they are garbage collected) and that new versions of the object are created at different locations in storage. As a consequence of writing objects in the append-only fashion, a scan for metadata objects may discover multiple versions of the same object in storage. Also, log-structured filesystems usually need a garbage collection process to reclaim space from dead objects in the filesystem. A garbage collection process in a log-structured filesystem may move a version of an object by making a new copy of that version of the object in a different location in storage without immediately reclaiming the earlier copy of the version of the object. As a result, a scan for metadata objects may also discover multiple copies of the same version of the object in the filesystem.

During the filesystem startup, the only version of an object that is relevant to the startup is the most recent one. Thus, effort and resources are spent on identifying a copy of the most recent version of an object among multiple copies and/or multiple versions of the object that may be discovered in the flash storage.

BRIEF DESCRIPTION OF THE DRAWINGS

Various embodiments of the invention are disclosed in the following detailed description and the accompanying drawings.

FIG. 4 is an example of a metadata object descriptor table.

FIG. 6 shows an example of a data structure that identifies the most recently updated segments in the system.

DETAILED DESCRIPTION

Figure 1:
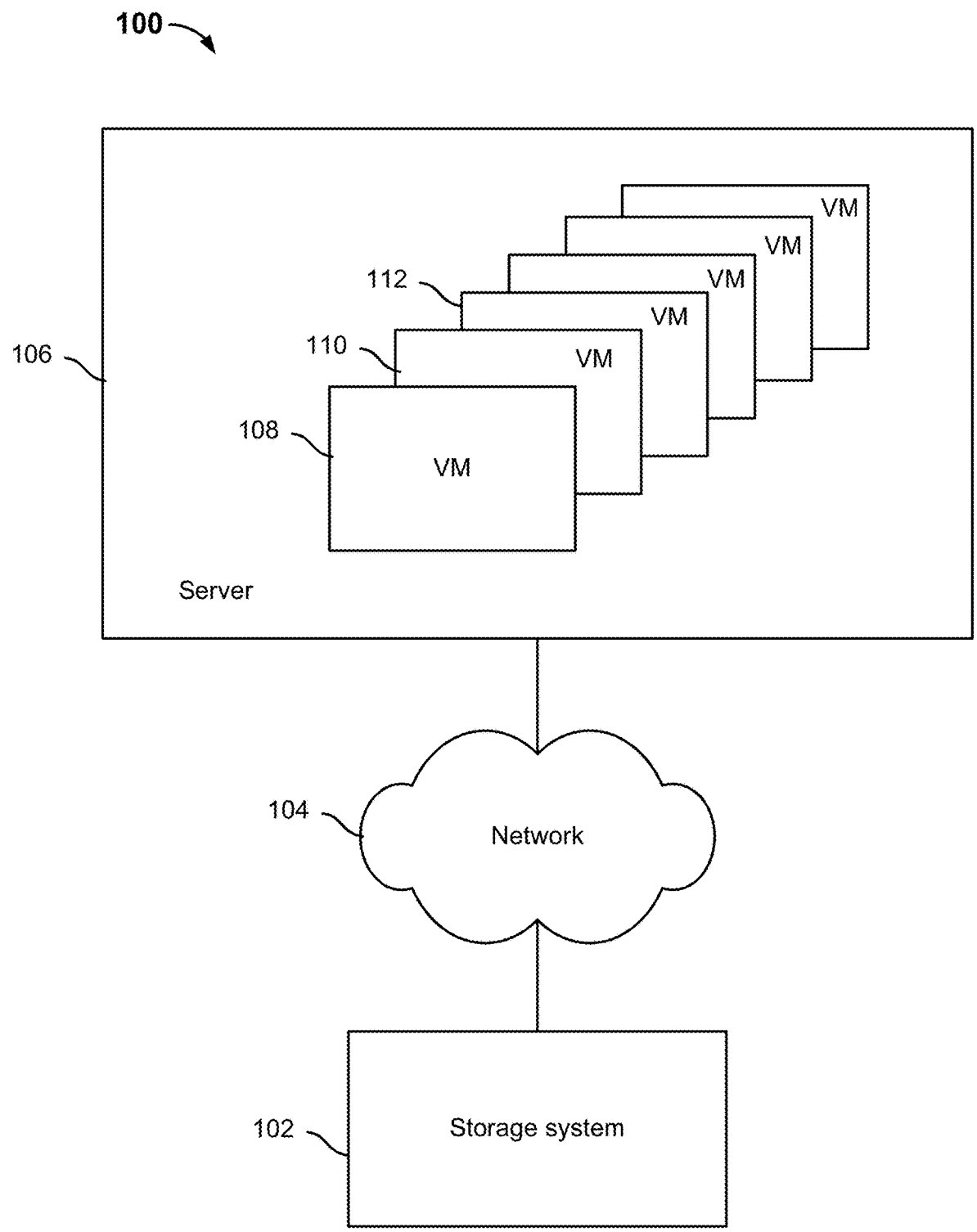
FIG. 1 is a diagram showing an embodiment of a storage system for the storage of virtual machines using virtual machine storage abstractions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of recovery of metadata state data in a log-structured filesystem using fuzzy checkpoints are described herein. In various embodiments, metadata state data represents data that needs to be generated in memory or in other non-persistent storage (e.g., during a system startup). In some embodiments, the metadata state data includes one or more of a metadata object descriptor table, a transactional log tree, and a segment map. Each of the metadata object descriptor table, the transactional log tree, and the segment map is a data structure. In various embodiments, the metadata object descriptor table provides information about where metadata is stored on a persistent (e.g., flash) storage. In various embodiments, each entry in a metadata object descriptor table comprises a descriptor for a "metadata object" (or sometimes referred to as a "metadata page") that includes a metadata object identifier, an address in persistent (e.g., flash) storage at which the metadata object/page is stored, a size associated with the metadata object/page, and/or a version associated with the metadata object/page. In various embodiments, a metadata object/page contains the actual metadata about the data in the filesystem. In various embodiments, the metadata object/page comprises blocks of metadata. In various embodiments, the transactional log tree assists with crash consistency in the filesystem. In various embodiments, each entry of the transactional log tree comprises a descriptor for a log entry in the filesystem. Log entries can be generated by transactions in the filesystem. In various embodiments, each entry in the segment map comprises a mapping between a logical address to a physical address. Embodiments of storing the metadata state data across a portion of the persistent, underlying storage in the filesystem are described herein. In various embodiments, the system is not stunned/frozen during the checkpointing process and as such, some of the metadata state data written across the portion of the underlying storage may become obsolete after being written. As such, the checkpoints may be referred to as "fuzzy." Also, embodiments of recovering the checkpointed metadata state data from the portion of the underlying storage to which it was written and rebuilding the data structure(s) of the checkpointed metadata state data in memory at a filesystem startup are described herein. After filesystem startup, the recovered metadata state data should be consistent with the metadata state data before the filesystem crashed/was rebooted.

In various embodiments, a persistent, underlying storage associated with a filesystem may include a number of equal-sized storage units. In various embodiments, a "storage unit" comprises a unit of write in any type of underlying storage (e.g., solid-state disk, hard disk, non-volatile random-access memory). For example, a flash storage may include a number of segments. In various embodiments, the checkpoints are throttled and the metadata state data is uniformly written over N storage units (e.g., different portions of the metadata state data are written to each of the N storage units), where N is configured to be a value that is fewer than the total number of storage units in the underlying storage. This also ensures that at the filesystem system startup, as few as N storage units need to be scanned (versus the conventional need to scan all of the storage units in the system) to guarantee discovery of all the metadata object descriptors, among other metadata state data, if any, in the system. The value of N can be user configurable or set to be a constant value, and should be less than the total number of storage units in the system. If the value of N is 1, then a monolithic checkpoint would be created, where the entire metadata object descriptor table is stored in one storage unit/location.

In some embodiments, a proportion of the total number of storage units of the underlying storage may be selected for N to represent the number of storage units in underlying storage to which to write the checkpointed metadata state data. For example, N can be selected to be one-tenth of the total number of storage units in the system. In various embodiments, a constant value may be selected for N to represent the number of storage units in underlying storage to which to write the checkpointed metadata state data, irrespective/independent of the size of the underlying storage. For example, regardless if there are 50,000 or 350,000 storage units in the system, N can always be configured to be 5,000 storage units. In the event that N is configured to be a constant/fixed value across systems of different sizes of underlying storage, the recovery of the checkpointed metadata state data across the N storage units can be referred to as occurring in "constant time," as scanning the same N number of storage units regardless of the total size of a system will take the same amount of time. By configuring a value of N as a small subset of the total number of storage units in the underlying storage, only a small portion of the entire underlying storage needs to be scanned at filesystem startup to discover the metadata state data, as compared to the conventional technique of scanning the entire underlying storage. By scanning significantly less of the underlying storage, the discovery of the same or different versions of the same objects is minimized, thus reducing redundant work.

For the metadata state data of the metadata object descriptor table, embodiments of the techniques described herein enable discovery of the most recent (and hence, the most relevant) copy of each metadata object by scanning only a small subset of the underlying storage. Conventionally, upon startup of the filesystem, the entire underlying storage was scanned, metadata objects were discovered, and this metadata object descriptor table was re-populated in memory. However, the time required to do this re-building was increasing and may cross the predetermined budget in a filesystem. By applying the techniques described herein, the metadata object descriptor table is checkpointed to N storage units periodically and the N storage units are remembered. At the filesystem startup, the at least most recent N storage units are read to recover the entries of the metadata object descriptor table. In various embodiments, the number of storage units N is constant/fixed/predetermined. This enables a constant time discovery of metadata objects, irrespective of the size of underlying storage.

Embodiments of the techniques described herein also leverage the high random read throughput of SSD drives, and issue I/O intelligently in a RAID-based (redundant array of inexpensive disks) underlying filesystem.

FIG. 1 is a diagram showing an embodiment of a storage system for the storage of virtual machines using virtual machine storage abstractions. In the example shown, system 100 includes server 106, network 104, and storage system 102. In various embodiments, network 104 includes various high-speed data networks and/or telecommunications networks. In some embodiments, storage system 102 communicates with server 106 via network 104. In some embodiments, the filesystem for the storage of virtual machines (VMs) using virtual machine storage abstractions does not include network 104, and storage system 102 is a component of server 106. In some embodiments, server 106 is configured to communicate with more storage systems other than storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of virtual machine storage abstractions. In some embodiments, the respective files associated with (at least) VMs 108, 110, and 112 running on server 106 are stored on storage system 102.

In various embodiments, storage system 102 is configured to store metadata identifying which stored data objects, such as files or other virtual machine storage abstractions, are associated with which VM or vdisk. In various embodiments, storage system 102 stores the data of VMs running on server 106 and also stores the metadata that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 102 refers to one or more physical systems and/or associated hardware and/or software components configured to work together to store and manage stored data, such as files or other stored data objects. In some embodiments, a hardware component that is used to (at least in part) implement the storage system may be comprised of either hard disk or SSD, or a combination of hard disk and SSD.

Figure 2:
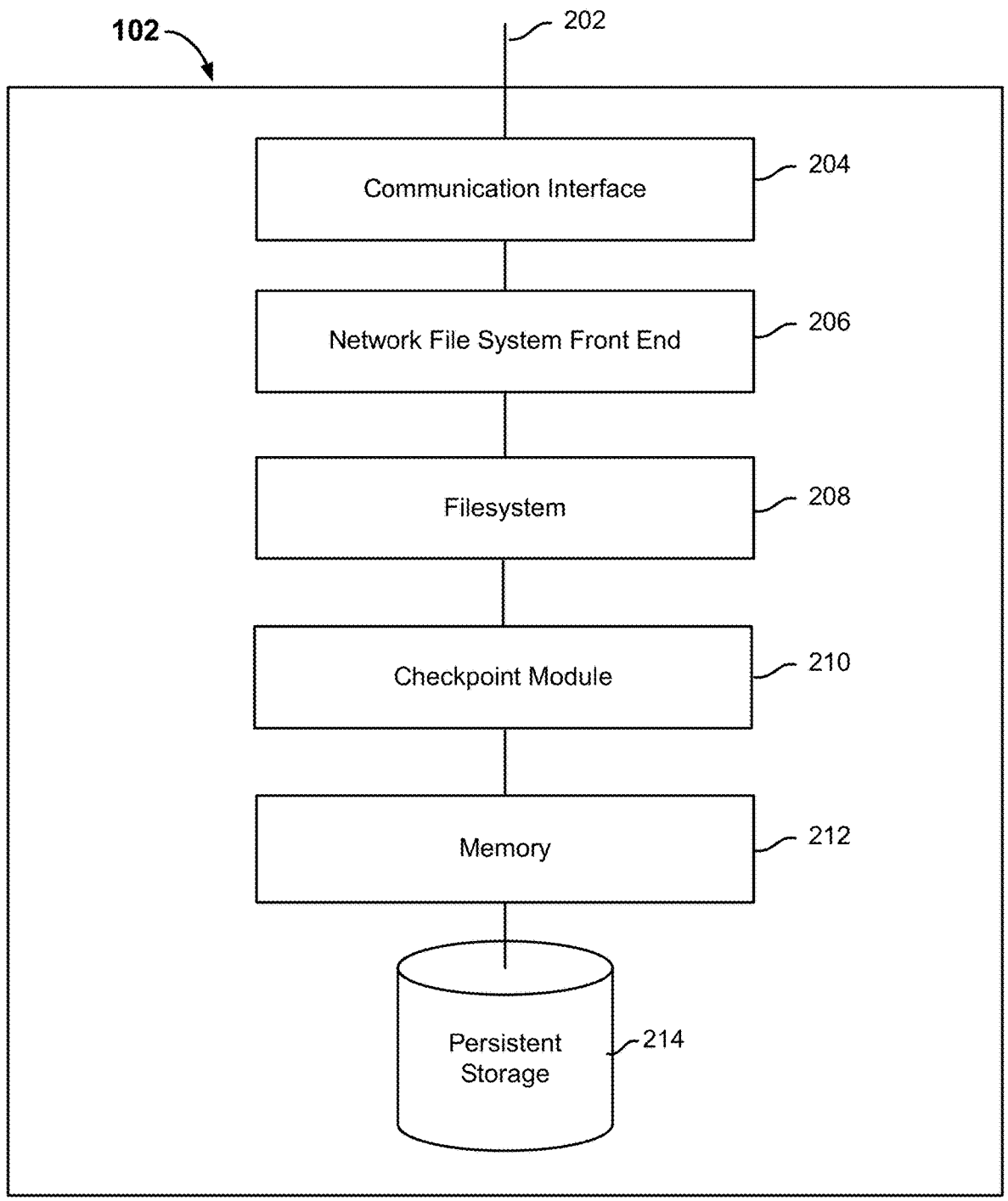
FIG. 2 is a block diagram illustrating an embodiment of a storage system including data and metadata.

FIG. 2 is a block diagram illustrating an embodiment of a storage system including data and metadata. In the example shown, storage system 102 includes a network connection 202 and a communication interface 204, such as a network interface card or other interface, which enable the storage system to be connected to and communicate via a network such as network 104 of FIG. 1. The storage system 102 further includes a network filesystem front end 206, connected to filesystem 208, configured to handle NFS requests from virtual machines running on systems such as server 106 of FIG. 1. In various embodiments, the network filesystem front end is configured to associate NFS requests as received and processed with a corresponding virtual machine and/or virtual disk (vdisk) with which the request is associated, for example, using metadata stored on storage system 102 or elsewhere. In various embodiments, persistent storage 214 is configured to store data and metadata. In some embodiments, persistent storage 214 stores metadata identifying which stored data objects, such as files or other virtual machine storage abstractions, are associated with which VM or vdisk. In various embodiments, persistent storage 214 stores the data of VMs and also stores the metadata that provides mapping or other identification of which data objects are associated with which specific VMs. In some embodiments, metadata state data determined based on the data and/or the metadata stored at persistent storage 214 is maintained in memory 212. In some embodiments, at least some of the metadata state data that is stored in memory 212 is generated based on the metadata stored at persistent storage 214. In some embodiments, the metadata state data stored in memory 212 includes a metadata object descriptor table, a transactional log tree, and/or a segment map. In various embodiments, persistent storage 214 comprises a number of equal-sized storage units. In some embodiments, persistent storage 214 comprises an SSD (e.g., flash) storage comprising a number of segments.

Checkpoint module 210 is configured to perform checkpointing of the metadata state data stored at memory 212 across a subset of all storage units in persistent storage 214. In some embodiments, the subset of all the storage units in persistent storage 214 comprises N storage units, where N is user configurable or is set to a constant value. As will be described in detail below, a dynamically determined portion of the metadata state data that is to be checkpointed will be written by checkpoint module 210 to each storage unit of the N storage units. In various embodiments, the length of N storage units over which the entire set of metadata state data is written is referred to as a "checkpoint window." In various embodiments, while metadata state data is written during a checkpoint window, other components of filesystem 208 progress normally and may write new objects or newer versions of the old objects. Put another way, the system is not frozen or stunned but remains alive during the checkpoint window. As a result of not freezing the system during the checkpoint window, a newer written version of the old object might make a previously written checkpointed descriptor entry stale. Hence, during recovery of the checkpointed data, an object descriptor that is discovered from an actual object will be used to replace a corresponding object descriptor discovered from a checkpointed entry for the same object. In some embodiments, checkpoint module 210 is configured to continuously write the metadata state data over N storage units, thereby forming a series of checkpoint windows.

Checkpoint module 210 is also configured to recover the checkpointed data during a filesystem recovery. For example, in the event that the system is rebooted or restarted (e.g., after a system crash), the metadata state data that was held in memory 212 is lost so checkpoint module 210 is configured to locate the N storage units over which the metadata state data was written to rebuild the metadata state data in memory 212. In various embodiments, the N storage units over which all of the metadata state data is written, is referred to as a "stable checkpoint window." In various embodiments, the checkpoint window from the last segment in the stable checkpoint window to the last persisted storage unit (the last storage unit to which metadata state data was written) before a crash or a reboot is referred to as the "current checkpoint window." If N storage units are written in the current checkpoint window, then the current checkpoint window becomes the last stable checkpoint window and a new current checkpoint window is created. The checkpointed data written in the previous, last stable checkpoint window can then become eligible to be garbage collected. In some embodiments, during recovery, checkpoint module 210 is configured to scan the storage units from both the last stable checkpoint window and the current checkpoint window. As described above, during the recovery process, checkpoint module 210 is configured to scan the storage units from both the last stable checkpoint window and the current checkpoint window for not only the checkpointed data but also actual object descriptors so that checkpoint module 210 can update any stale entries of the checkpointed data with object descriptors associated with newer/updated versions that are found among the scanned actual objects.

Checkpointing

Figure 3:
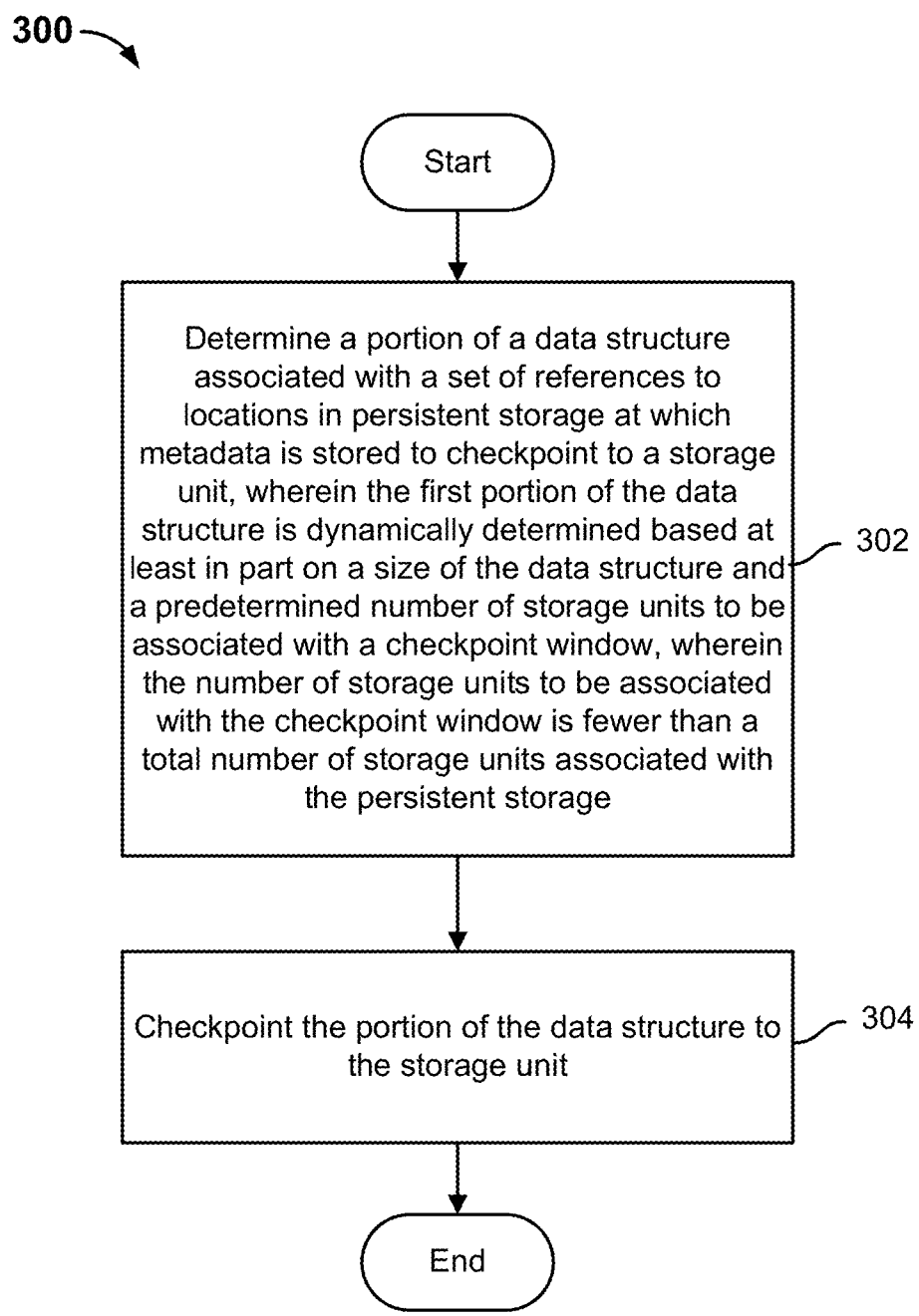
FIG. 3 is a flow diagram showing an embodiment of a process for performing fuzzy checkpoints.

FIG. 3 is a flow diagram showing an embodiment of a process for performing fuzzy checkpoints. In some embodiments, process 300 is implemented at a storage system such as storage system 102 of system 100 of FIG. 1.

At 302, a portion of a data structure associated with a set of references to locations in persistent storage at which metadata is stored to checkpoint to a storage unit is determined, wherein the portion of the data structure is dynamically determined based at least in part on a size of the data structure and a predetermined number of storage units to be associated with a checkpoint window, wherein the number of storage units to be associated with the checkpoint window is fewer than a total number of storage units associated with the persistent storage. In various embodiments, the data structure associated with a set of references to locations in persistent storage at which metadata is stored comprises a metadata object descriptor table. In various embodiments, the metadata object descriptor table is maintained in memory. The metadata object descriptor table includes entries that describe metadata objects/pages, including the locations in persistent (e.g., flash) storage at which the metadata objects/pages are stored and the most recent versions of those metadata objects/pages. An example of a metadata object descriptor table is shown in FIG. 4, below. In various embodiments, a "storage unit" comprises a unit of storage. For example, if the persistent storage is flash storage, then a storage unit is a segment. In various embodiments, a value for N can be user configured and used as the predetermined number of storage units over which to write the metadata object descriptor table. The entire metadata object descriptor table being written to N storage units comprises a checkpoint window. In various embodiments, N is configured to be a value that is fewer than the total number of storage units in the persistent storage. For example, N can be selected to be a value that is a fraction of the total number of storage units in the persistent storage. For example, if there were 50,000 segments in a flash storage, N can be set to only 5,000 segments. In various embodiments, a different portion (e.g., a different set of metadata object descriptors) of the metadata object descriptor table is written to each storage unit of the N storage units. The portion of the metadata object descriptor table to be written to the storage unit is dynamically determined based on, in some embodiments, the value of N and the size of the data structure. The portion of the metadata object descriptor table to be written to the storage unit is also dynamically determined based at least in part on the portion of the metadata object descriptor table that has been written to one or more other storage units in the current checkpoint window and/or a remaining portion of the metadata object descriptor table that has not yet been written to a storage unit in the current checkpoint window. For example, the size of a metadata object descriptor table can vary (e.g., between 1 GB to 5 GB). If N is configured to be X and if 3 metadata object descriptor objects are written per segment, then assume that we can accommodate 1 GB in X segments. Then to accommodate 5 GB in X segments, we will need to write 3×5=15 metadata object descriptor objects per segment.

In some embodiments, the storage unit to which to write a portion of the metadata object descriptor table to is opportunistically selected. Opportunistically selecting storage units refers to selecting a storage unit to which other requested data (e.g., data that was user requested) was determined to be written. For example, either a newly created storage unit or an existing storage unit to which requested data was to be written can be selected as a storage unit to which a portion of the metadata object descriptor table can be additionally written. Put another way, the portion of the metadata object descriptor table can be piggybacked onto another write to a storage unit.

At 304, the portion of the data structure is checkpointed to the storage unit. The portion of the data structure is written to the storage unit. In various embodiments, the portion of the data structure is written to the storage unit along with other data that was requested to be written to the storage unit. In some embodiments, other values that can be used to identify, for example, the current checkpoint window and the last stable checkpoint window are also written to the storage unit. In some embodiments, the portion (e.g., entries) of the data structure is packaged as Keen Flash Checkpointing (KFC) data objects prior to being written to the storage unit. In various embodiments, checkpointed data is sometimes referred to as "KFC objects."

In some embodiments, process 300 is repeated for each storage unit of the N storage units associated with the checkpoint window. While only the metadata object descriptor table is described as being written to N storage units associated with the checkpoint window, other examples of metadata state data including a transactional log tree and a segment map can be written to the N storage associated with the checkpoint window in a similar manner.

In various embodiments, the persistent storage comprises SSD (e.g., flash) because of the high random read I/O throughput nature of flash. This property of flash allows the checkpointed data to be broken up into many smaller chunks and spread out over time to minimize impact on user operations as well as spread out the data more uniformly to take advantage of all SSDs during recovery. As a result, the checkpointed objects are interspersed throughout the underlying storage, and the filesystem startup performs a lot of random read I/Os where we see very high throughput.

FIG. 4 is an example of a metadata object descriptor table. Metadata object descriptor table 400 is maintained in memory and includes entries of metadata object descriptors that describe metadata objects/pages that are stored in persistent storage (e.g., flash storage). Entry 402 identifies a metadata object/page associated with the page ID of "0," is stored at location F100001 in the flash storage, and whose most recent version that exists at the flash storage is version 2. In some embodiments, each entry of a metadata object descriptor table also indicates a size of the metadata object/page (not shown in the example of FIG. 4). As shown in metadata object descriptor table 400, a metadata object descriptor table stored in memory can be used to locate/identify metadata objects/pages that are stored in persistent storage but may not actually include any content of the metadata objects/pages. In some embodiments, one or more entries of a metadata object descriptor table such as metadata object descriptor table 400 can be written to each storage unit (e.g., segment) of N storage units of a checkpoint window. In some embodiments, a metadata object descriptor table can grow as big as a few hundred megabytes (MBs).

In various embodiments, a metadata object descriptor table is also referred to as a "Page Table" and each entry of the Page Table is referred to as a "Page Table Entry" (PTE). In some embodiments, in addition to the metadata object descriptor table, other examples of metadata state data that is checkpointed include a Transactional Log Tree and a Segment Table. In some embodiments, the Page Table is a significant portion of the state that needs to be checkpointed.

Figure 5:
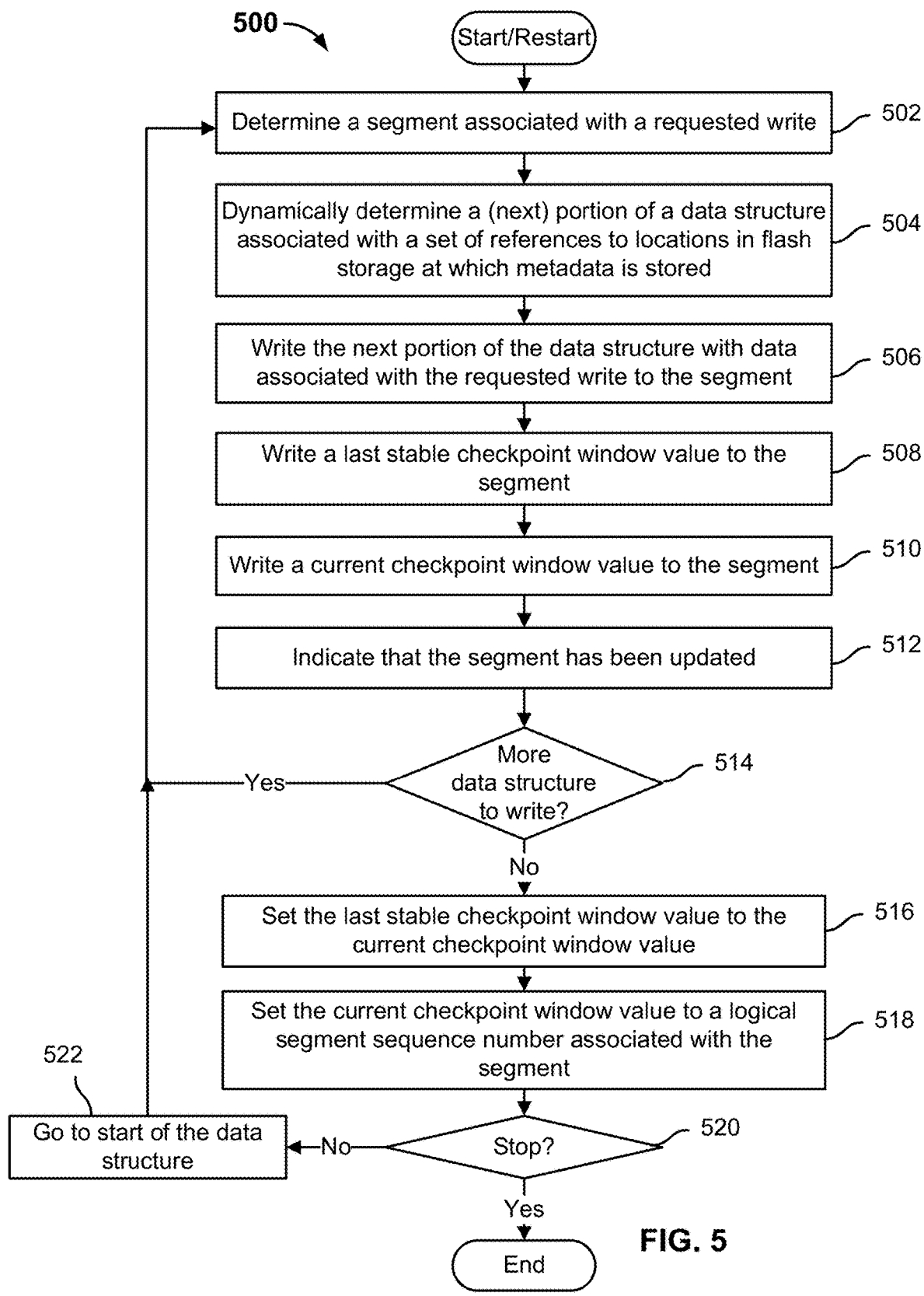
FIG. 5 is a flow diagram showing an example of a process for performing fuzzy checkpoints.

FIG. 5 is a flow diagram showing an example of a process for performing fuzzy checkpoints. In some embodiments, process 500 is implemented at a storage system such as storage system 102 of system 100 of FIG. 1. In some embodiments, process 300 of FIG. 3 is implemented using process 500.

Process 500 begins when the system is started up or restarted (e.g., after a system crash). Process 500 describes an example process of writing portions of a metadata object descriptor table across N storage units in each current checkpoint window, wherein the value of N has already been configured. In process 500, the persistent storage comprises an SSD (e.g., flash) storage that is made up of segments.

At 502, a segment associated with a requested write is determined. In some embodiments, a segment to which a portion of the metadata object descriptor table is to be written is opportunistically selected as any storage unit for which data (other than the data to be stored in the checkpoint) was requested to be written. For example, the segment may comprise either a newly created segment or an existing segment to which data is requested by a user to be written. Given that data is already requested to be written to the segment, the segment can be determined as one of the N segments over which to checkpoint/write the entire metadata object descriptor table.

In various embodiments, each segment that is modified (e.g., written to) is indicated in a data structure that identifies the most recently updated segments in the system. In some embodiments, each entry of the data structure that identifies a recently updated segment in the system comprises a logical segment sequence number associated with a recently updated segment and, for example, the time at which the segment was updated. For example, FIG. 6, below, shows an example data structure that identifies the most recently updated segments in the system. The N segments over which the entire metadata object descriptor table is to be written can be thought of as N consecutive segments that are identified in the data structure that identifies the most recently updated segments in the system.

At 504, a (next) portion of a data structure associated with a set of references to locations in flash storage at which metadata is stored is dynamically determined. A next portion of the metadata object descriptor table that is to be written to a segment is determined. In various embodiments, a portion of the metadata object descriptor table to be written to the segment is dynamically determined based on, in some embodiments, the value of N and the size of the data structure. The portion of the metadata object descriptor table to be written to the storage unit can also be dynamically determined based at least in part on the portion of the metadata object descriptor table that has been written to other segments in the current checkpoint window and/or a remaining portion of the metadata object descriptor table that has not yet been written to a segment in the current checkpoint window. In some embodiments, if the segment is the first segment to be written to in the current checkpoint window, a portion of the metadata object descriptor table to write to the segment may be determined from the start/top of the metadata object descriptor table.

At 506, the next portion of the data structure is written to the segment with data associated with the requested write. The determined portion of the metadata object descriptor table is written to the segment in addition to the data that was requested to be written to the segment. In some embodiments, the determined portion of the metadata object descriptor table is written to the segment as one or more KFC objects. Because SSD storage is relatively quick in performing writes, SSD may be advantageous to use to write even a large write that comprises both the determined portion of the metadata object descriptor table along with the data associated with the requested write.

At 508, a last stable checkpoint window value is written to the segment. A last stable checkpoint window value represents a value that can be used to determine the segment at the head of the most recent stable checkpoint window. In some embodiments, the last stable checkpoint window value is also referred to as the "lastStableCkptSegmentSequenceNumber." In some embodiments, the last stable checkpoint window value comprises the logical segment sequence number of the segment that is at the head of the most recent stable checkpoint window. In some embodiments, the last stable checkpoint window value is written to the trailer of the segment.

At 510, a current checkpoint window value is written to the segment. A current checkpoint window value represents a value that can be used to determine the segment at the head of the current checkpoint window. In some embodiments, the current checkpoint window value is also referred to as the "curCkptSegmentSequenceNumber." In some embodiments, the current checkpoint window value comprises the logical segment sequence number of the segment that is at the head of the current checkpoint window. In some embodiments, the current checkpoint window value is written to the trailer of the segment.

At 512, the segment is indicated to have been updated. After the requested data and the determined portion of the metadata object descriptor table are written to the segment, the logical segment sequence number of the segment is added to the data structure that identifies the most recently updated segments in the system to indicate that the segment is the most recently updated segment in the system.

At 514, it is determined whether there is more of the data structure to write. In the event that it is determined that there is more of the data structure to checkpoint/write, control is returned to step 502. Otherwise, in the event that it is determined that there is not more of the data structure to checkpoint/write, control is transferred to step 516. If there is any remaining portion of the metadata object descriptor table to write and/or if fewer than N segments have been written to in the current checkpoint window, then control is returned to step 502 to write the next dynamically determined portion of the metadata object descriptor table to the next segment that is determined to be updated. If there is no remaining portion of the metadata object descriptor table to write and/or if exactly N segments have been written to in the current checkpoint window, then control is transferred to step 516.

At 516, the last stable checkpoint window value is set to the current checkpoint window value. Because there is no remaining portion of the metadata object descriptor table to write and/or exactly N segments have been written to in the current checkpoint window, the current checkpoint window becomes the last stable checkpoint window and a new current checkpoint window is created. The current checkpoint window can become the last stable checkpoint window by setting the last stable checkpoint window value to the current checkpoint window value. The updated last stable checkpoint window value will identify the segment that is at the head of the past, current checkpoint window. In some embodiments, the checkpointed data associated with the previous, last stable checkpoint window is now eligible to be garbage collected.

At 518, the current checkpoint window value is set to a logical segment sequence number associated with the segment. The new current checkpoint window is created by setting the current checkpoint window value to the logical segment sequence number of the last (Nth) segment to which the metadata object descriptor table was written in the past, current checkpoint window.

At 520, it is determined whether process 500 should be stopped. In the event that it is determined that the process is to be stopped, process 500 ends. Otherwise, in the event that it is determined that the process is not to be stopped, control is transferred to step 522, at which the metadata object descriptor table is to be written in the new current checkpoint window, starting again from the start/top of the metadata object descriptor table. For example, process 500 can be stopped if the system is shut down and/or the checkpointing process is determined to be halted for some reason.

FIG. 6 shows an example of a data structure that identifies the most recently updated segments in the system. Segments comprise storage units in an SSD (e.g., flash) storage. Each entry of data structure 600 identifies a recently updated segment in the system, including a logical segment sequence number associated with the segment and the time at which the segment was updated. In various embodiments, the logical segment sequence number is a monotonically increasing number that is assigned to a segment every time to which it is written. In the example of data structure 600, an entry associated with the most recently updated segment is placed at the top row of the data structure, an entry associated with the second most recently updated segment is placed at the second row from the top of the data structure, an entry associated with the third most recently updated segment is placed at the third row from the top of the data structure, and so forth. As such, data structure 600 stores the sequence of the most recently updated segments in the system. After each segment is updated in the system, an entry is added at the top of data structure 600 to identify the most recently updated segment.

The example of data structure 600 is also denoted with references to entries associated with the "last persisted segment," the "current checkpoint window," "segment at the head of the current checkpoint window," "last stable checkpoint window," and "segment at the head of the last stable checkpoint window." The "last persisted segment" identifies the last segment to which a portion of the metadata object descriptor table was written in the current checkpoint window before the system crashed or was rebooted. In the example of FIG. 6, assume that the N=8. The "segment at the head of the current checkpoint window" identifies the segment (the segment with logical segment sequence number 111) before the first segment that is included in the current checkpoint window. As such, the first segment that is included in the current checkpoint window is the segment with logical segment sequence number 112. The "current checkpoint window" references the segments that are included in the current checkpoint window. However, given that the "last persisted segment" (the segment with logical segment sequence number 116) is not the $8^{th}$ (Nth) segment from the first segment that is included in the current checkpoint window, the segment with logical segment sequence number 112, the system crashed prior to the current checkpoint window completing. The "segment at the head of the last stable checkpoint window" identifies the segment (the segment with logical segment sequence number 103) before the first segment that is included in the last stable checkpoint window. As such, the first segment that is included in the last stable checkpoint window is the segment with logical segment sequence number 104. The "last stable checkpoint window" references the segments that are included in the last stable checkpoint window. The "last stable checkpoint window" reference includes 8 (N) segments, starting from the first segment that is included in the last stable checkpoint window, the segment with logical segment sequence number 104, to the "segment at the head of the current checkpoint window" (the segment with logical segment sequence number 111), which identifies the last segment that is included in the "last stable checkpoint window."

In some embodiments, the logical segment sequence numbers of the "segment at the head of the current checkpoint window" and the "segment at the head of the last stable checkpoint window" are written in each segment that is updated such that if the segment becomes the last persisted segment, the logical segment sequence numbers of the "segment at the head of the current checkpoint window" and the "segment at the head of the last stable checkpoint window" can be read from the last persisted segment and used with a data structure such as data structure 600 to identify the segments associated with the last stable checkpoint window and the current checkpoint window in a recovery process, which will be described in detail further below.

Figure 7:
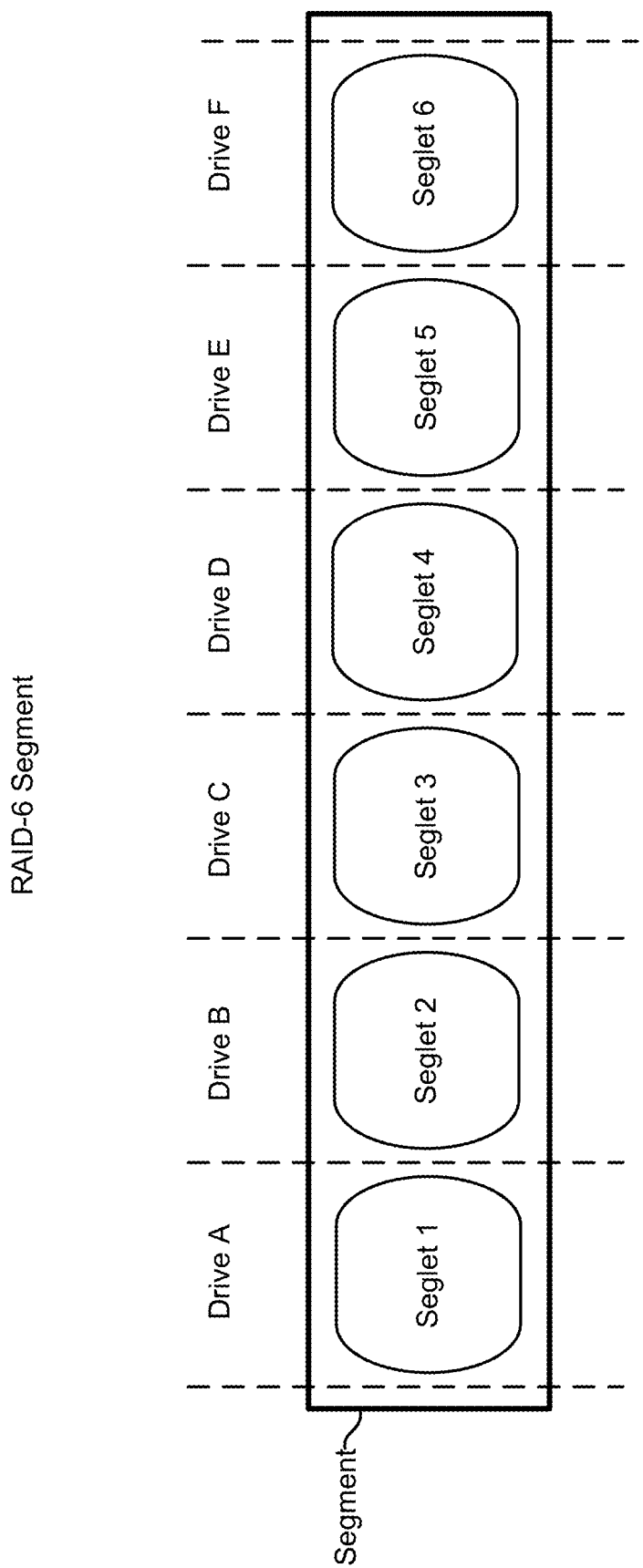
FIG. 7 is a diagram showing an example segment in a RAID-6 configuration.

FIG. 7 is a diagram showing an example segment in a RAID-6 configuration. In various embodiments, the persistent storage system comprises SSD storage. An example type of SSD storage is flash storage. A storage unit in flash storage is a segment. In various embodiments, the SSD storage is configured in a RAID-6 configuration, in which each segment is divided into six smaller storage units referred to as "seglets." Each seglet is written to a separate drive, out of which two of the seglets are kept for RAID parity, and the rest are used to store data/metadata. As shown in the example in FIG. 7, each of the six seglets (seglet 1, seglet 2, seglet 3, seglet 4, seglet 5, and seglet 6) of a RAID-6 segment is stored at one of six drives (Drive A, Drive, B, Drive C, Drive D, Drive E, and Drive F). As mentioned above, in various embodiments, the persistent storage system may comprise SSD storage because of the high random read I/O throughput nature of SSD. This characteristic of SSD allows the checkpointed metadata state data to be broken into many smaller chunks and written to N segments in a manner that is spread out over time to minimize the impact on user operations as well as distribute the data more uniformly to take advantage of all SSDs during recovery. As a result, the checkpointed data objects are interspersed throughout the underlying SSD storage. The high random read I/O throughput of SSD storage is also advantageous during a recovery of the checkpointed data, during which many random reads will be issued to recover the checkpointed data from the N segments to which they were written. Furthermore, during a recovery of the checkpointed data, in scanning a segment to which checkpointed data was written, I/Os can be issued to multiple drives to read seglets in parallel to increase the overall I/O throughput. Details regarding recovery of checkpointed data will be described further below.

In some embodiments, one or more of the following three in-memory metadata state data related data structures are to be stored across N storage units of a checkpoint window:

1) Page Table: The descriptors to the metadata pages in the filesystem are stored in a Page Table. Each entry in this table is a "Page Table Entry" (PTE). In various embodiments, the Page Table is also sometimes referred to as a "metadata object descriptor table."

2) Transactional Log Tree: The descriptors to the log entries in the filesystem are stored in a Transactional Log Tree. Each entry in this tree is a "Log Chunk Entry" (LCE).

3) Segment Map: A mapping between a logical to a physical segment number is stored in a Segment Map. Each entry in this table is a "Segment Map Entry."

In some embodiments, the Page Table (metadata object descriptor table) is a significant portion of the state that needs to be checkpointed. A simple scheme is to ensure that the Write Pipeline is flushed and quiesced, the entire Page Table written out, and the checkpoint is marked as DONE. However, this impacts the Write Pipeline performance by an order of magnitude and is not acceptable, in some embodiments. Therefore, PTEs are written out to the persistent storage at a controlled throughput. For example, 900 MB of PTE can be spread across N storage units. Checkpoints are fuzzy because at the end of the checkpoint, the PTE that was written out to the persistent storage might have become obsolete.

In some embodiments, the Transactional Log Tree and Segment Map can be written out as one chunk if the max object size that can be written to the persistent storage is increased. If not, the LCE and Segment Map Entries can be split into max object size (e.g., 16K) chunks and then written out.

As mentioned above, in some embodiments where the persistent storage comprises flash storage, the scheme implemented in the flash log structured filesystem (flog) is referred to as Keen Flash Checkpointing (KFC). In order to write out the metadata state data related PTEs, Log Entries, and Segment Map to the flash storage, in one example, the following three filesystem (flog) KFC object types can be used:

FLOG_TYPE_PTE, which is configured to store Page Table entries, PTE.

FLOG_TYPE_LOG_ENTRY, which is configured to store Transactional Log Treeentries, LCE.

FLOG_TYPE_SEGMENT_MAP, which is configured to store Segment Map entries.

The KFC objects of one or more types are stored with metadata objects/pages in seglets of a segment. An example of a seglet layout with KFC objects is shown in FIG. 8, below.

Figure 8:
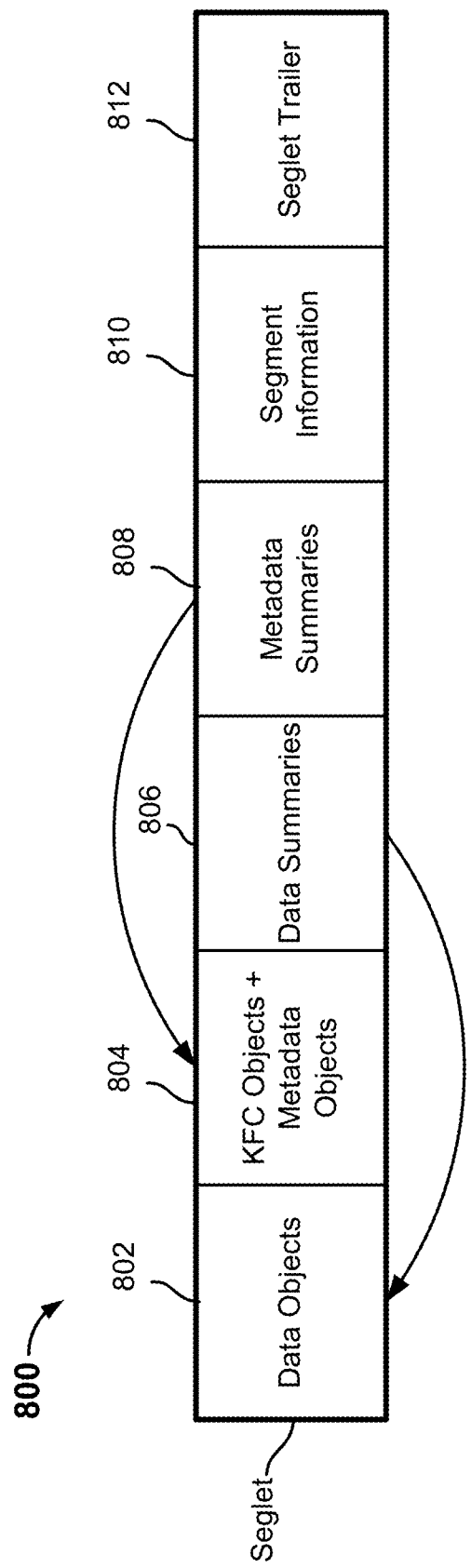
FIG. 8 is a diagram showing an example of a layout of a seglet storing KFC objects.

FIG. 8 is a diagram showing an example of a layout of a seglet storing KFC objects. Seglet 800 describes the data layout of one seglet of multiple seglets that are included in a segment in SSD (e.g., flash) storage. In some embodiments, a seglet of the example segment of FIG. 7 can be implemented with the example seglet layout of FIG. 8. In the example of FIG. 8, seglet 800 includes the following sections: data objects section 802, KFC objects and metadata objects section 804, data summaries section 806, metadata summaries section 808, segment information section 810, and seglet trailer section 812. The data objects and metadata objects are stored in separate sections of seglet 800. Data summaries section 806 is used to index the data objects that are stored in data objects section 802. Metadata summaries section 808 is used to index the KFC objects and the metadata objects stored in KFC objects and metadata objects section 804. As such, metadata summaries section 808 stores metadata object descriptors and KFC object descriptors. This segregation of data objects and metadata objects is just for enabling more efficient discovery of just metadata during a filesystem recovery. By indexing the KFC objects and metadata objects in separate metadata summaries section 804, only metadata summaries section 808 needs to be read to determine the KFC objects and metadata objects that are stored in seglet 800. Metadata summaries section 808 includes pointers (or other references) to KFC objects and also metadata object descriptors of metadata objects that are stored in seglet 800. The pointers (or other references) stored in metadata summaries section 808 can be used to read/retrieve the KFC objects, the checkpointed data, stored in seglet 800. The metadata object descriptors of metadata objects stored in metadata summaries section 808 can be used to identify which versions of which metadata objects are stored in seglet 800. Segment information section 810 stores metadata associated with the segment to which seglet 800 belongs, including information associated with the other seglets of that segment, the size of metadata summaries section 808, and the size of data summaries section 806. For example, segment information section 810 stores information indicating which seglets of the segment to which seglet

800 belongs stores KFC objects and/or metadata objects. Seglet trailer section 812 stores data specifically associated with seglet 800 including, for example, the last stable checkpoint window value and the current checkpoint window value.

The following are example techniques of implementing the filesystem KFC object types of FLOG_TYPE_PTE, FLOG_TYPE_LOG_ENTRY, and FLOG_TYPE_SEGMENT_MAP. Other techniques of generating KFC objects may be used as well.

1) FLOG_TYPE_PTE

During a filesystem recovery, the Page Table data structure needs to be rebuilt in memory. During the checkpointing process, in generating each checkpoint, the FLOG_TYPE_PTE objects are written to the flash storage by reading the in-memory Page Table that is maintained. Storing a "pageid" in each PTE is an extra overhead of 8 bytes. To amortize this cost, multiple PTEs can be batched in a list and the pageid for only the first PTE in the list can be stored. An example diagram of batched PTEs stored with a pageid is stored in FIG. 9, below. For example, the number of PTEs batched in a list is determined as follows:

> Max Flog Object Size>=$n \times$sizeof(PTE)+sizeof(pageid_t)+sizeof(checkpoint_id)
>
> 16$K$>=$n \times$18+8+8
>
> $n$<=909

Figure 9:
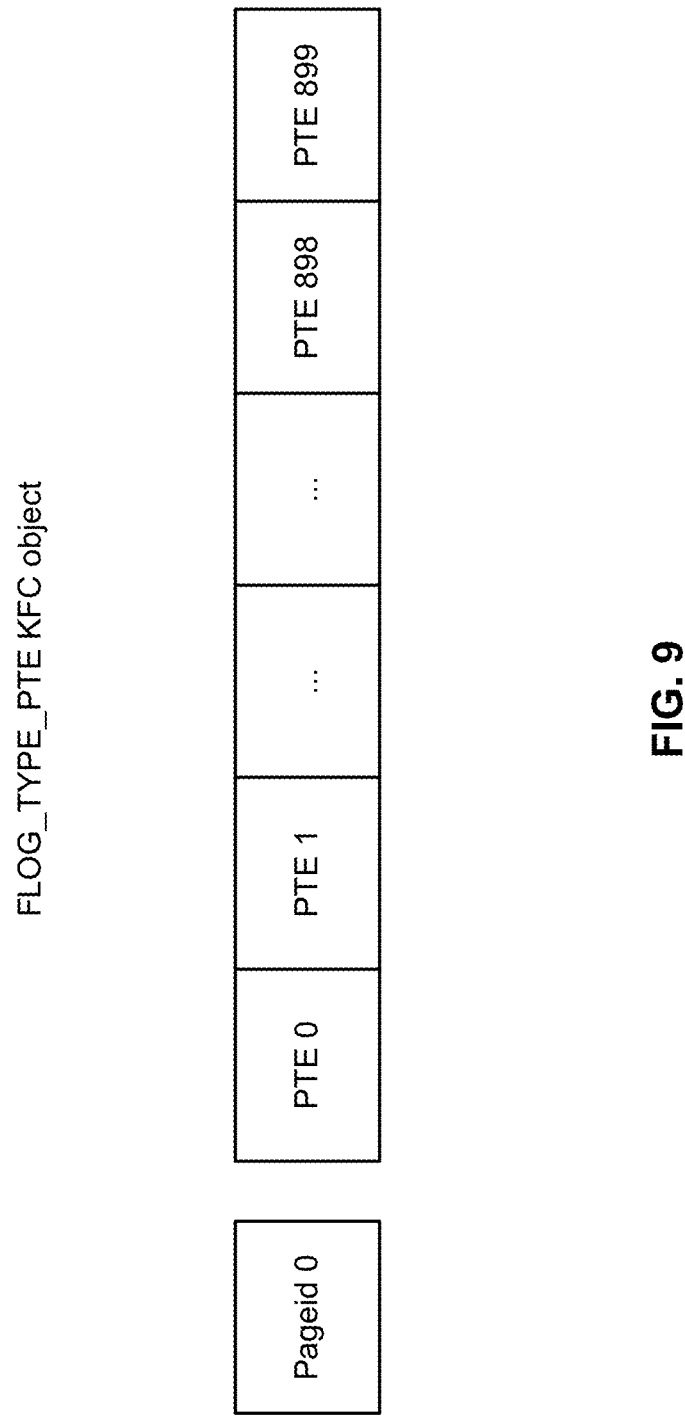
FIG. 9 is a diagram showing an example diagram of batched PTEs stored with a pageid stored in one FLOG_TYPE_PTE KFC object.

FIG. 9 is a diagram showing an example diagram of batched PTEs stored with a pageid stored in one FLOG_TYPE_PTE KFC object. As shown in the example of FIG. 9, the FLOG_TYPE_PTE KFC object includes a list of multiple PTEs (from PTE 0 through PTE 899) and only the pageid of just the first PTE in the list (pageid 0).

An upper bound can be maintained on the number of segments (e.g., ~10K segments) over which all the PTEs of the Page Table should be distributed. In some embodiments, the number of PTEs per each FLOG_TYPE_PTE KFC object is 900. For example, the following is an example of determining the number of PTEs stored in each FLOG_TYPE_PTE KFC object:

> # of FLOG_TYPE_PTE objects per segment=ceil (Number of *MD* pages/(UpperBound*Number of PTEs per FLOG_TYPE_PTE))

2) FLOG_TYPE_LOG_ENTRY

For example, the Transactional Log Treedata structure (e.g., StasisFlogLogTree) is represented as a map of Log Chunk Entries (e.g., StasisFlogLogChunkNode records), ordered by log LSN, where log LSN is the Logical Sequence Number uniquely assigned to each log entry and that is monotonically increasing. An example of a FLOG_TYPE_LOG_ENTRY KFC object is shown as a packed structure below:

```
typedef struct StasisFlogLogEntryNode {
  uint64 checkpointId_;
  flogAddr_t flogAddr_;
  lsn_t logLsn_;
  uint16 size_; // uncompressed
  uint16 flashSize_; // compressed
  bool antiAliased_;
} __attribute__((__packed__)) StasisFlogLogEntryNode;
MAX_NUM_LOG_ENTRY_PER_FLOG_OBJ
  = Max Flog Object Size / sizeof( StasisFlogLogChunkNode )
  = 16K / 21 = 780
StasisFlogLogEntryNode
logArr[MAX_NUM_LOG_ENTRY_PER_FLOG_OBJ];
```

3) FLOG_TYPE_SEGMENT_MAP

A Segment Map is a logical to physical segment mapping. An example logical to physical mapping structure in a FLOG_TYPE_SEGMENT_MAP KFC object is shown in FIG. 10, below.

Figure 10:
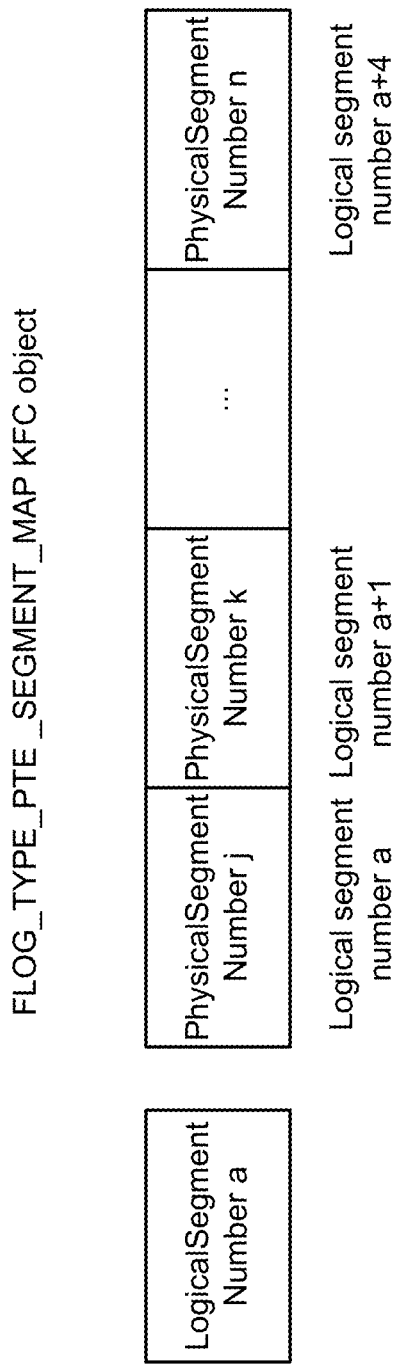
FIG. 10 is a diagram showing an example logical to physical mapping structure in a FLOG_TYPE_SEGMENT_MAP KFC object.

FIG. 10 is a diagram showing an example logical to physical mapping structure in a FLOG_TYPE_SEGMENT_MAP KFC object. As shown in the example of FIG. 10, the FLOG_TYPE_SEGMENT_MAP KFC object includes a list of multiple physical segment numbers (from physical segment number j through physical segment number n) and the logical segment number that maps to the first physical segment number of the list (physical segment number j).

An example of a FLOG_TYPE_SEGMENT_MAP KFC object is shown as a structure below:

```
typedef struct SegmentMapNode {
  uint64 checkpointId_;
  LogicalSegmentNumber firstLogicalSegmentInBatch_;
  PhysicalSegmentNumber physicalSegmentNumArr_[
MAX_SEGMENTS_PER_FLOG_OBJ];
} __attribute__((__packed__)) SegmentMapNode;
MAX_SEGMENT_PER_FLOG_OBJ ~ ( 16K / 8 ) <~ 8192
```

In some embodiments, the above KFC object types can be compressed using general purpose or specialized compression algorithms.

In some embodiments, at the start of each checkpoint window, the PTEs from the Page Table are written to the flog segments as normal writes to flog. Whenever flog allocates a new storage unit to write, flog signals a condition variable in checkpoint module to write out a set of KFC specific flog object types. In some embodiments, the checkpoint module (e.g., checkpoint module 210 of FIG. 2) writes all the PTEs from the Page Table first, followed by the LCEs of the Transactional Log Tree, and followed by entries from the Segment Map.

In some embodiments, flog early flush of in-memory storage unit to flash is issued, flog signals the checkpoint module with information about the remaining space in the current segment. The checkpoint module will compute approximately how many objects it can accommodate in the current segments. This effectively utilizes the wasted space in flog's storage unit due to early flushes. This operation is blocking, because flog has to wait for the checkpoint module to fill up the segment with flog objects.

Figure 11:
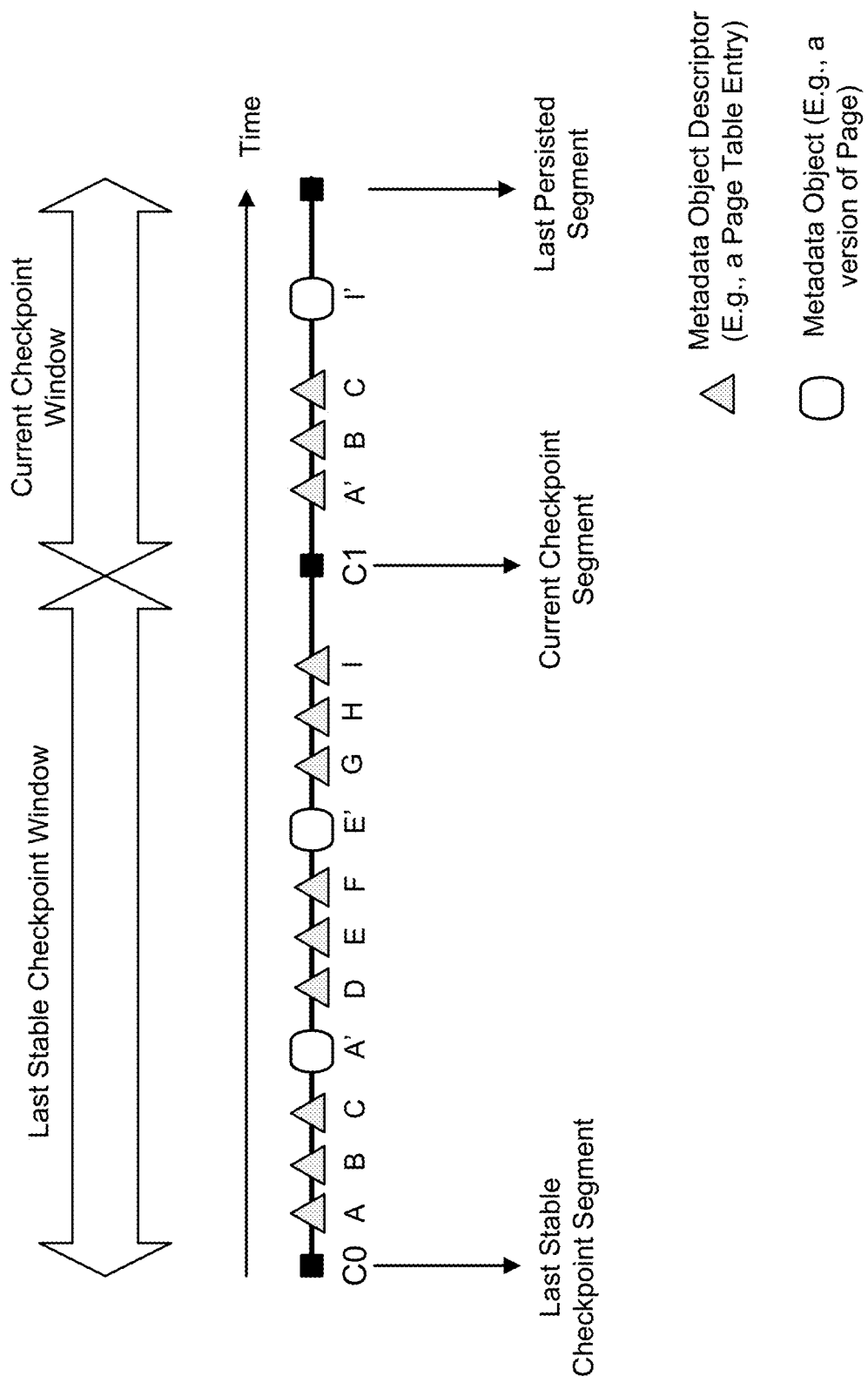
FIG. 11 is a diagram showing an example of a last stable checkpoint window and a current checkpoint window.

FIG. 11 is a diagram showing an example of a last stable checkpoint window and a current checkpoint window. As described above, a stable checkpoint window comprises all the metadata state data being written across all N storage units. A current checkpoint window comprises the current window to which metadata state data is being written across the N storage units. If a system crash occurs prior to completing writing metadata state data across all N storage units, then the last storage unit in the current checkpoint window to which metadata state data was written is referred to as a "last persisted segment." The stable checkpoint window that immediately precedes the current checkpoint window is referred to as a "last stable checkpoint window." In some embodiments, where the storage comprises SSD storage, to keep track of these the last stable checkpoint window and the current checkpoint window, the following two logical segment sequence numbers are stored in each segment to which metadata state data was written:

1) lastStableCkptSegmentSequenceNumber: This is the logical segment sequence number of the segment that is at the head of the last stable checkpoint window.

2) curCkptSegmentSequenceNumber: This is the logical segment sequence number of the segment that is at the head of the current checkpoint window.

Both of the values for lastStableCkptSegmentSequenceNumber and curCkptSegmentSequenceNumber are updated each time that the current checkpoint window becomes the last stable checkpoint window and a new current checkpoint window is created. An example of updating the values of lastStableCkptSegmentSequenceNumber and curCkptSegmentSequenceNumber is described in FIG. 12, below. As mentioned above, in various embodiments, the system is not stunned/frozen during the checkpointing process and as such, some of the metadata state data written to the storage units may become obsolete after being written.

As shown in FIG. 11, in the last stable checkpoint window, Page Table Entries (PTEs) associated with the metadata object descriptors for the then-current versions of metadata objects A, B, and C from the Page Table (the metadata object descriptor table) were written to one or more segments as one or more KFC objects. Sometime after the metadata object descriptors for the then-current versions of metadata objects A, B, and C from the Page Table were written to one or more segments in the last stable checkpoint window, a newer version of metadata object A, A', was generated and its corresponding metadata object descriptor entry was updated in the Page Table. However, given that the metadata object descriptor for the older version of metadata object A had already been checkpointed in the last stable checkpoint window, the updated metadata object descriptor entry for the newer version of metadata object A, A', was not checkpointed in the last stable checkpoint window. Similarly, in the last stable checkpoint window, PTEs associated with the metadata object descriptors for the then-current versions of metadata objects D, E, F from the Page Table were written to one or more segments as one or more KFC objects. Sometime after the metadata object descriptors for the then-current versions of metadata objects D, E, F from the Page Table were written to one or more segments in the last stable checkpoint window, a newer version of metadata object E, E', was generated and its corresponding metadata object descriptor entry was updated in the Page Table. However, given that the metadata object descriptor for the older version of metadata object E had already been checkpointed in the last stable checkpoint window, the updated metadata object descriptor entry for the newer version of metadata object E, E', was not checkpointed in the last stable checkpoint window.

As shown in FIG. 11, in the current checkpoint window, PTEs associated with the metadata object descriptors for the then-current versions of metadata objects A', B, and C from the Page Table were written to one or more segments as one or more KFC objects. Sometime after the metadata object descriptors for the then-current versions of metadata objects A', B, and C from the Page Table were written to one or more segments in the current checkpoint window, a newer version of metadata object I, I', was generated and its corresponding metadata object descriptor entry was updated in the Page Table. However, given that the system then crashed, the newer version of metadata object I, I', will not be checkpointed in the current checkpoint window. In the example of FIG. 11, the system crashed during the current checkpoint window, leaving the "Last Persisted Segment" as the last segment to which metadata state data was written in the current checkpoint window.

When the system is restarted after the crash, in various embodiments, the checkpointed Page Table can be recovered by reading the segments from both the last stable checkpoint window and the current checkpoint window. Given that there are N segments in the last stable checkpoint window and up to N segments in the current checkpoint window, the recovery scan may read up to 2*N number of segments. As described above, each segment to which metadata state data is written also stores the lastStableCkptSegmentSequenceNumber and curCkptSegmentSequenceNumber values, including the "Last Persisted Segment." The "Last Persisted Segment" can be identified by identifying the most recently updated segment prior to the system crash in a data structure (e.g., such as the data structure shown in FIG. 6) that identifies the most recently updated segments in the system. As such, the lastStableCkptSegmentSequenceNumber and the curCkptSegmentSequenceNumber can be read from the "Last Persisted Segment" of FIG. 11. The read lastStableCkptSegmentSequenceNumber and the curCkptSegmentSequenceNumber values can be used with reference to a data structure (e.g., such as the data structure shown in FIG. 6) that identifies the most recently updated segments in the system to identify the "Last Stable Checkpoint Segment," the N segments included in the last stable checkpoint window, the "Current Checkpoint Segment," and the at most N segments included in the current checkpoint window of FIG. 11. The identified up to 2*N segments of the last stable checkpoint window and the current checkpoint window are then used to recover the Page Table in memory.

In various embodiments, when the up to 2*N segments of the last stable checkpoint window and the current checkpoint window are scanned during a filesystem recovery, the up to 2*N segments are scanned for not only the checkpointed data (KFC objects) but also the most updated versions of the metadata objects stored at the each segment. In various embodiments, a metadata object descriptor discovered from an actual metadata object stored at a segment is trusted more than the metadata object descriptor discovered from a checkpointed entry (e.g., a KFC object) for the same metadata object. Put another way, a metadata object descriptor discovered from an actual metadata object during the scan of a segment will be used to overwrite, in the rebuilt Page Table, a corresponding checkpointed metadata object descriptor entry associated with an older version of the same metadata object that was found in a stored KFC object. As such, any stale checkpointed metadata object descriptor entries from stored KFC objects can be replaced with updated metadata object descriptors associated with the updated versions of the metadata objects that are discovered during recovery. Referring to the example of FIG. 11, the stale checkpointed metadata object descriptors of metadata objects A, E, and I will be replaced with their corresponding updated metadata object descriptors associated with the metadata objects' newer versions of A', E', and I', respectively.

Figure 12:
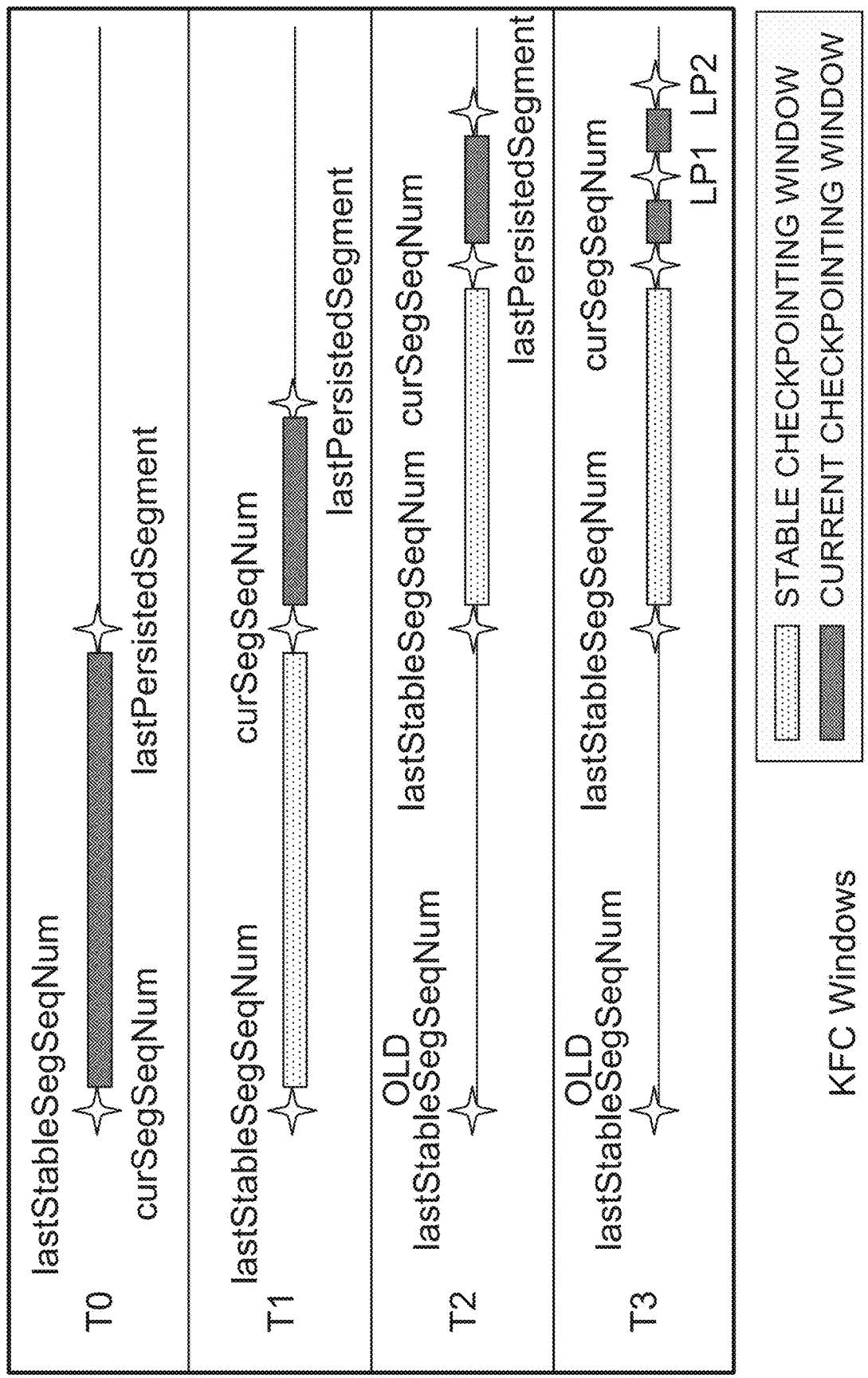
FIG. 12 is a diagram showing an example of performing checkpointing across checkpoint windows.

FIG. 12 is a diagram showing an example of performing checkpointing across checkpoint windows. At time T0, the first checkpoint window is started. At time T0, the lastStableCkptSegmentSequenceNumber= curCkptSegmentSequenceNumber. A stable checkpoint window does not yet exist. Hence, if a recovery were to be performed shortly after time T0, the scan window includes only the current checkpoint window. At time T1, when the current checkpoint window completes to become a stable checkpoint window, the value of the curCkptSegmentSequenceNumber is set to the logical segment sequence number associated with the last segment that was written in the stable checkpoint window. If a recovery were to be performed shortly after time T1, the scan window includes both the last (and only) stable checkpoint window and also the current checkpoint window. The current checkpoint window might not contain all the metadata state data content (e.g., the PTEs, LCEs, and segment maps) and spans up to the point of a system crash i.e., the last persisted segment. At time T2, when the current checkpoint window completes to become another stable checkpoint window, the value of the lastStableCkptSegmentSequenceNumber is updated to be equal to curCkptSegmentSequenceNumber, and the value of the curCkptSegmentSequenceNumber is updated to be equal to the logical segment sequence number associated with the last segment that was written in the most recent or last stable checkpoint window. The checkpointed objects from the first (old) stable checkpoint window can be garbage collected. For example, the checkpointed objects from the first stable checkpoint window can be marked as "dead" so that a garbage collection process can eventually reclaim them. At time T3, if the system repeatedly crashes, then the last checkpointed data (e.g., what was the FLOG_TYPE_PTE, FLOG_TYPE_LOG_ENTRY, and/or FLOG_TYPE_SEGMENT_MAP, that was last written out to a segment) in the current checkpoint window is determined and the checkpointing process continues writing to the same current window from the next metadata state data object to be written.

Recovery

Figure 13:
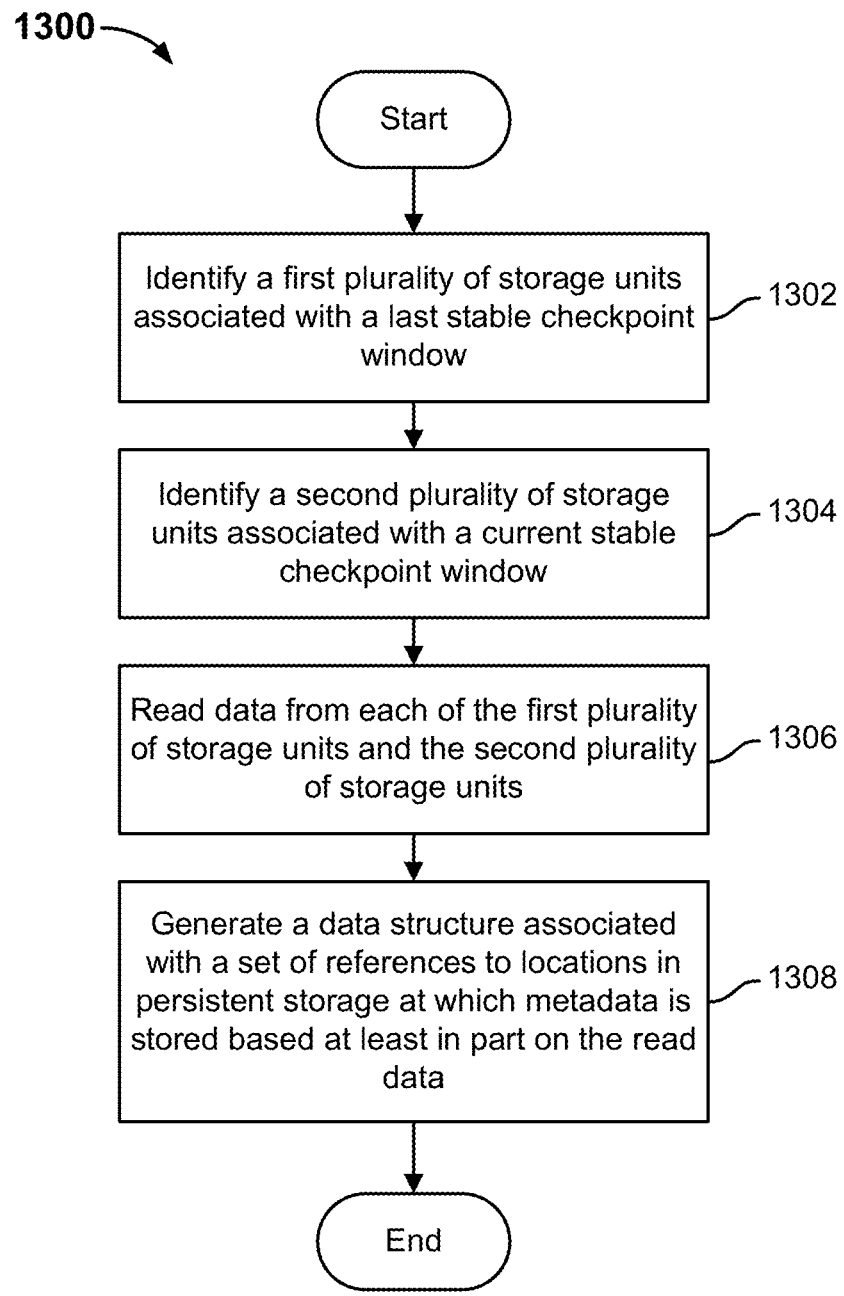
FIG. 13 is a flow diagram showing an embodiment of a process of recovering a data structure by reading from storage units associated with a last stable checkpoint window and a current checkpoint window.

FIG. 13 is a flow diagram showing an embodiment of a process of recovering a data structure by reading from storage units associated with a last stable checkpoint window and a current checkpoint window. In some embodiments, process 1300 is implemented at a storage system such as storage system 102 of system 100 of FIG. 1.

Process 1300 can be used during a filesystem startup (e.g., after a system crash) to recover any checkpointed metadata state data that was written to the persistent storage before the system crash.

At 1302, a first plurality of storage units associated with a last stable checkpoint window is identified. All N storage units that were written to during the last stable checkpoint window are identified. The last stable checkpoint window comprises the stable checkpoint window that immediately precedes the current checkpoint window.

At 1304, a second plurality of storage units associated with a current checkpoint window is identified. Up to N storage units that were written to during the current checkpoint window are identified. The current checkpoint window comprises the checkpoint window that was written to just before the system crash occurred.

At 1306, data is read from each of the first plurality of storage units and the second plurality of storage units. At least a portion of data is read from each storage unit identified from the last stable checkpoint window and each storage unit from the current checkpoint window. In various embodiments, checkpointed metadata state data stored as KFC objects are read from each of the storage units associated with the last stable checkpoint window and the current checkpoint window.

At 1308, a data structure associated with a set of references to locations in persistent storage at which metadata is stored based at least in part on the read data is generated. In various embodiments, the read KFC objects are parsed to obtain entries associated with one or more metadata state data related data structures, such as the metadata object descriptor table (the Page Table). Other examples of metadata state data related data structures include the Transactional Log Tree and the Segment Map. The metadata object descriptor table (as well as the other metadata state data related data structures such as the Transactional Log Tree and the Segment Map) may be rebuilt and held in memory or another form of non-persistent storage.

Figure 14:
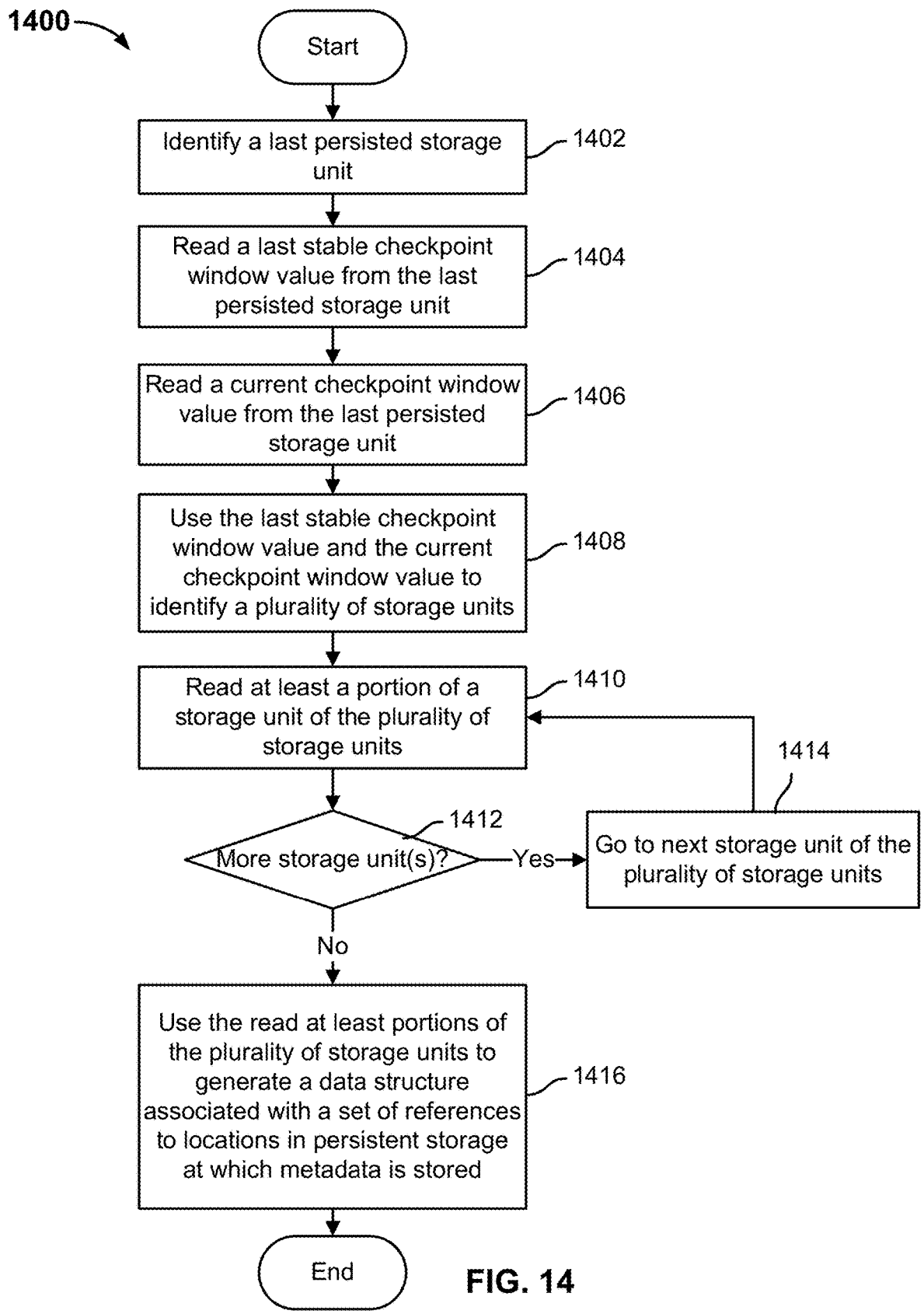
FIG. 14 is a flow diagram showing an example of a process of recovering a data structure by reading from storage units associated with a last stable checkpoint window and a current checkpoint window.

FIG. 14 is a flow diagram showing an example of a process of recovering a data structure by reading from storage units associated with a last stable checkpoint window and a current checkpoint window. In some embodiments, process 1400 is implemented at a storage system such as storage system 102 of system 100 of FIG. 1. In some embodiments, process 1300 of FIG. 13 may be implemented at least in part by process 1400.

At 1402, a last persisted storage unit is identified. The last persisted storage unit comprises the last storage unit that was written to in the current checkpoint window before the system crashed. In some embodiments, the last persisted storage unit is identified by checking a data structure (e.g., such as the data structure of FIG. 6) that identifies the most recently updated segments in the system to determine the most recently updated segment in the system before the crash.

At 1404, a last stable checkpoint window value is read from the last persisted storage unit. The last stable checkpoint window value identifies the head of the most recent stable checkpoint window. In some embodiments, the last stable checkpoint window value is written to the trailer of the last persisted storage unit. In some embodiments, where the persistent storage comprises SSD (e.g., flash) storage and each storage unit comprises a segment, the last stable checkpoint window value may be the lastStableCkptSegmentSequenceNumber.

At 1406, a current checkpoint window value is read from the last persisted storage unit. The current checkpoint window value identifies the head of the current checkpoint window. In some embodiments, the current checkpoint window value is written to the trailer of the last persisted storage unit. In some embodiments, where the persistent storage comprises SSD (e.g., flash) storage and each storage unit comprises a segment, the current checkpoint window value may be the curCkptSegmentSequenceNumber.

At 1408, the last stable checkpoint window value and the current checkpoint window value are used to identify a plurality of storage units. The last stable checkpoint window value and the current checkpoint window value are used to identify the storage units that are included in the last stable checkpoint window and the current checkpoint window. In some embodiments, the last stable checkpoint window value and the current checkpoint window value are used to identify the storage units that are included in the last stable checkpoint window and the current checkpoint window by checking the data structure that identifies the most recently updated segments in the system (e.g., such as the data structure of FIG. 6).

In some embodiments, where the persistent storage comprises SSD storage and each storage unit comprises a segment, the last stable checkpoint window value may be the lastStableCkptSegmentSequenceNumber and the current checkpoint window value may be the curCkptSegmentSequenceNumber, and the following example technique may be used to identify the segments associated with the last stable checkpoint window or the current checkpoint window:

For the first used segment in each container, which includes multiple segments, the logical segment sequence number is read and the containers are ordered by writes. Then, the container with a segment associated with the lastStableCkptSegmentSequenceNumber is looked up, if it exists, and the next used segment in that container is identified as the first segment of the last stable checkpoint window and as a start segment to scan. For example, the start segment to scan may be called the "last stable segment." Otherwise, the container with the segment associated with the logical segment sequence number that is greater than lastStableCkptSegmentSequenceNumber is chosen, and the first used segment in that container is chosen as the start segment to scan. This can be optimally done by maintaining container IDs in a data structure referred to as an "ordered map," where the container IDs are ordered by logical segment sequence numbers. Then, all used segments from the last stable segment to the last persisted segment from the ordered map are identified as segments included in the last stable checkpoint window and the current checkpoint window.

At 1410, at least a portion of a storage unit of the plurality of storage units is read. At least a portion of a storage unit included in the last stable checkpoint window and/or the current checkpoint window is read to determine the metadata state data that was written to that storage unit. In some embodiments, the checkpointed data written to each storage unit is stored as one or more KFC objects. In some embodiments, in addition to reading the one or more KFC objects of each storage unit, the metadata object descriptors of metadata objects that are stored at the storage unit are also scanned and if they describe newer versions of metadata objects, these discovered metadata object descriptors are used to replace the corresponding checkpointed entries.

At 1412, it is determined whether there is at least one more storage unit of the plurality of storage units. In the event there is at least one more storage unit, control is transferred to step 1414, at which a next storage unit is to be addressed at step 1410. Otherwise, in the event there is not at least one more storage unit, control is transferred to step 1416. The checkpointed data written to each storage unit is read.

At 1416, the read at least portions of the plurality of storage units is used to generate a data structure associated with a set of references to locations in persistent storage at which metadata is stored. The checkpointed data (e.g., KFC objects) is read from each storage unit associated with the last stable checkpoint window or the current checkpoint window. In some embodiments, the KFC objects are parsed to obtain entries associated with one or more state related data structures, such as the metadata object descriptor table (the Page Table). Other examples of metadata state data related data structures include the Transactional Log Tree and the Segment Map. The metadata object descriptor table and/or other metadata state data related data structures may be rebuilt and held in memory or another form of non-persistent storage.

Figure 15:
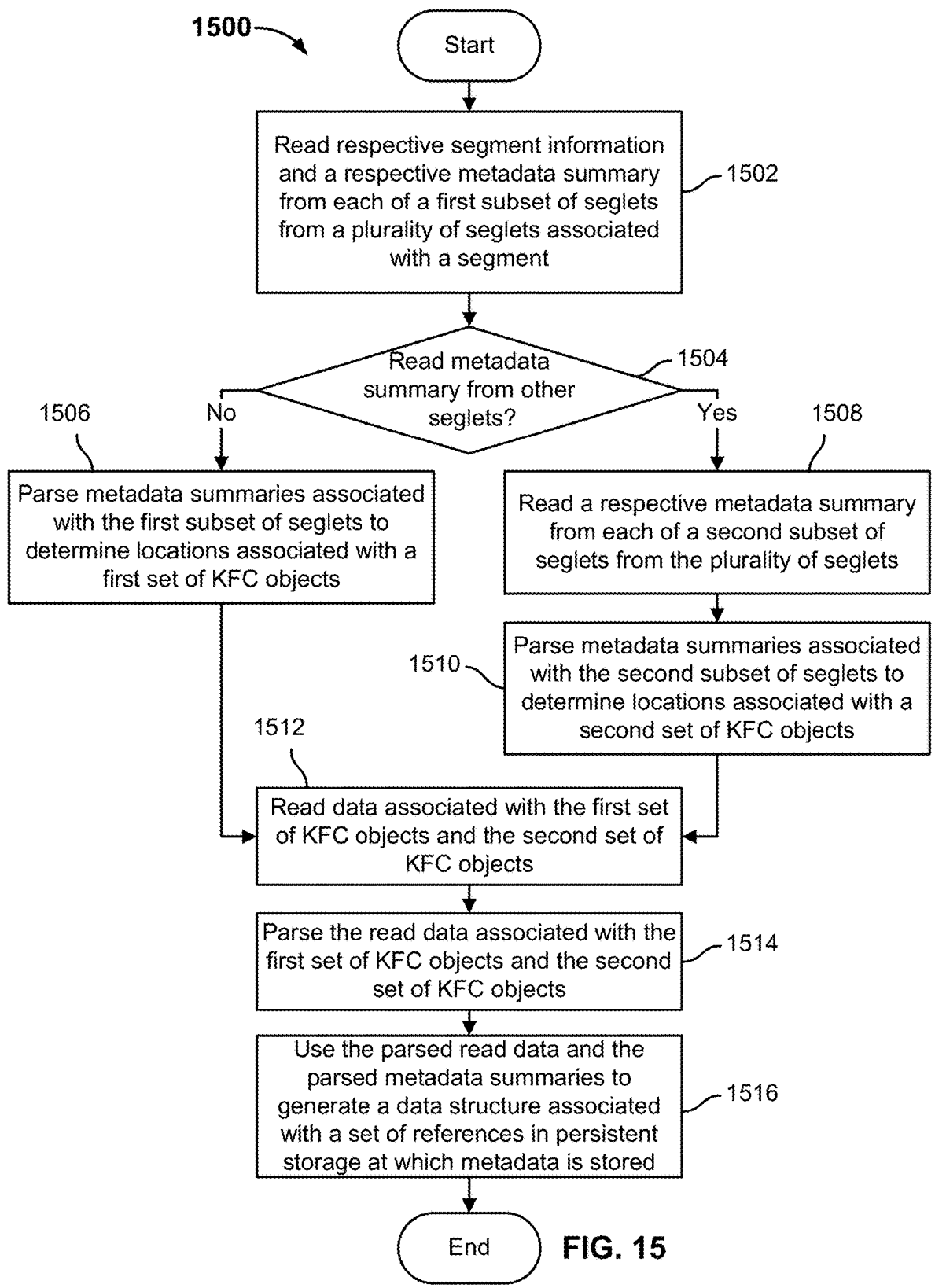
FIG. 15 is a flow diagram showing an example of a process of recovering a data structure by reading from segments associated with a last stable checkpoint window and a current checkpoint window.

FIG. 15 is a flow diagram showing an example of a process of recovering a data structure by reading from segments associated with a last stable checkpoint window and a current checkpoint window. In some embodiments, process 1500 is implemented at a storage system such as storage system 102 of system 100 of FIG. 1. In some embodiments, steps 1410 through 1416 of process 1400 of FIG. 14 may be implemented at least in part by process 1500.

Process 1500 shows an example process of recovering checkpointed data stored from one segment in an SSD (e.g., flash) storage. As described above, each segment includes multiple seglets, each stored on a different drive. Prior to process 1500, the segments from the last stable checkpoint window and the current checkpoint window are identified. Process 1500 performs a read on (e.g., at least a subset of seglets from) one particular segment that was identified from the last stable checkpoint window and the current checkpoint window. Process 1500 can be performed with each segment that was identified from the last stable checkpoint window and the current checkpoint window during a recovery process. In some embodiments, two or more instances of process 1500 may each be performed in parallel on a different segment, but different seglets of each segment, and therefore drives from each segment are read at least partially in parallel so as to distribute the I/O workload across different drives.

At 1502, respective segment information and a respective metadata summary are read from each of a first subset of seglets from a plurality of seglets associated with a segment. In some embodiments, fewer than all of the seglets in a segment are read, at first. Each seglet has information about other seglets in the segment, such as, for example, the number of metadata object descriptors and their locations stored by the other seglets. In some embodiments, to keep a quorum, a first subset of three seglets (or another user configured number of seglets) from a segment is initially accessed to determine if any more of the remaining seglets in the segment also need to be read. In some embodiments, for each seglet of the first subset of seglets to be read, the portion of the seglet that includes both the metadata summaries section and the segment information section is accessed in one read.

At 1504, it is determined whether metadata summaries should be read from other seglets in the segment.

The segment information section retrieved from each seglet in the first subset of seglets read at step 1502 are potentially the same and are read from multiple seglets to ensure the consistency of the segment information across the read seglets. The read segment information of each seglet is parsed and is used to identify which seglets of the segment store KFC objects (checkpointed data), as not necessarily every seglet of a segment may store KFC objects and/or metadata objects. The read segment information is therefore used to identify whether the seglets of the segments that have been initially read at step 1502 already include all the seglets of the segment that store KFC objects and/or metadata objects. In some embodiments, the seglet trailers of the seglets read at step 1502 are also verified. The metadata summaries section is desired from each seglet of the segment that stores KFC objects as the metadata summaries section includes pointers (or other references) to KFC objects that are stored in the seglet and also metadata object descriptors of metadata objects that are stored in the seglet. The pointers (or other references) stored in the metadata summaries section can be used to read/retrieve the KFC objects, the checkpointed data, stored in the seglet. The metadata object descriptors of metadata objects stored in the metadata summaries section can be used to identify which versions of metadata objects are stored in the seglet.

For those seglets that are determined to store KFC objects and whose metadata summaries sections have already been read at step 1502, a subsequent read does not need to be issued to those seglets for their metadata summaries sections as their metadata summaries sections have already been "prefetched" in the initial read of step 1502. As such, the reading of the metadata summaries sections from the first subset of seglets read at step 1502 comprises a type of prefetching that may potentially save a subsequent read for the metadata summaries sections from at least some of those seglets.

For those seglets that are determined to store KFC objects and whose metadata summaries sections have not already been read at step 1502, a subsequent read does need to be issued to those seglets for their metadata summaries sections.

Figure 16:
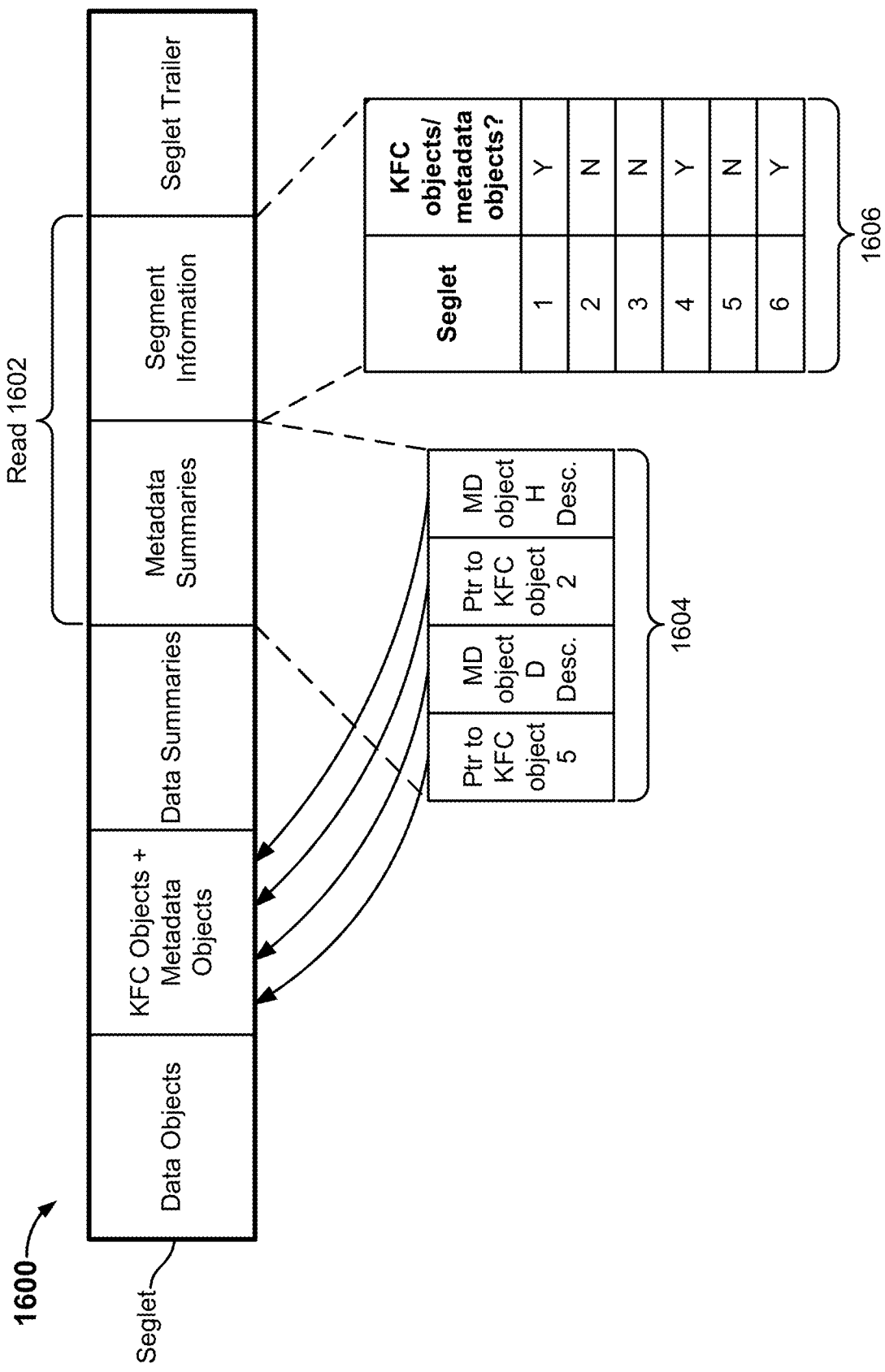
FIG. 16 shows an example of a layout of a seglet.

For example, FIG. 16 shows an example of a layout of a seglet that is initially read at step 1502 of process 1500. Seglet 1600 is included in a first subset of seglets in a segment for which a read, such as read 1602, is issued. Read 1602 retrieves both the metadata summaries section and the segment information section of seglet 1600. The segment information section is retrieved by read 1602 to determine for which seglets in the segment, the metadata summaries sections are needed. The metadata summaries section is retrieved by read 1602 as a form of prefetching in case seglet 1600 is determined to be a seglet that does store KFC objects. In the example of FIG. 16, segment information section zoom-in 1606 shows an example close up of the segment information section of seglet 1600. Segment information section zoom-in 1606 includes a table that identifies each seglet (seglet 1, seglet 2, seglet 3, seglet 4, seglet 5, and seglet 6) of the segment and whether that seglet stores any KFC objects and/or metadata objects (where "Y" indicates that the seglet stores KFC objects and/or metadata objects and that "N" indicates that the seglet does not store KFC objects or metadata objects). In the example of FIG. 16, only seglets 1, 4, and 6 store KFC objects in the segment. Metadata summaries section zoom-in 1604 shows an example close up of metadata summaries section of seglet 1600. Metadata summaries section zoom-in 1604 includes pointers (or other references) to the KFC objects that are stored in the KFC objects and metadata objects section of seglet 1600 and descriptors of metadata objects that are stored in the KFC objects and metadata objects section of seglet 1600. In particular, metadata summaries section zoom-in 1604 stores the pointers associated with KFC objects 5 and 2 and the metadata object descriptors of metadata objects D and H. Assuming that seglet 1600 comprises seglet 1 in the segment since seglet 1600 does store KFC objects, another read does not need to be issued to seglet 1600 as the metadata summaries section of seglet 1600 have already been retrieved by read 1602. However, if either or both of seglets 4 and 6 have not yet been read during the initial reading, then a subsequent read would need to be issued to whichever one(s) of seglets 4 and 6 that have not been read to retrieve their respective metadata summaries sections.

Returning to FIG. 15, in the event that the metadata summaries sections do need to be read from other seglets in the segment, control is transferred to 1508. Otherwise, in the event that the metadata summaries that are stored in the seglet do not need to be read from other seglets in the segment, control is transferred to 1506.

At 1506, metadata summaries associated with the first subset of seglets are parsed to determine locations associated with a first set of KFC objects. If no more seglets need to be read, the metadata summaries sections prefetched from the seglets read at step 1502 are parsed to determine the pointers (or other references) to the KFC objects that are stored in the KFC objects and metadata objects section of each respective seglet.

At 1508, a respective metadata summary is read from each of a second subset of seglets from the plurality of seglets. Those one or more seglets that have been determined to store KFC objects and metadata objects but were not read at step 1502 are issued read requests for their respective metadata summaries sections.

At 1510, metadata summaries associated with the second subset of seglets are parsed to determine locations associated with a second set of KFC objects. The metadata summaries sections retrieved from seglets by step 1508 are parsed to determine the pointers (or other references) to the KFC objects that are stored in the KFC objects and metadata objects section of each respective seglet.

At 1512, data associated with the first set of KFC objects and the second set of KFC objects is read. The pointers (or other references) to the KFC objects that are stored in the KFC objects and metadata objects section of each respective seglet of the segment are used to identify the locations at which the KFC objects are actually stored in the KFC objects and metadata objects section of each respective seglet. Reads are then issued to the seglets of the segment that store KFC objects to obtain the actual KFC objects that are stored in the KFC objects and metadata objects section of each respective seglet.

At 1514, the read data associated with the first set of KFC objects and the second set of KFC objects is parsed. The KFC objects retrieved from the seglets of the segment that store KFC objects are parsed to obtain one or more types of KFC objects including at least FLOG_TYPE_PTE associated with PTEs. In some embodiments, the retrieved KFC objects may also include FLOG_TYPE_LOG_ENTRY and/or FLOG_TYPE_SEGMENT_MAP.

Figure 18:
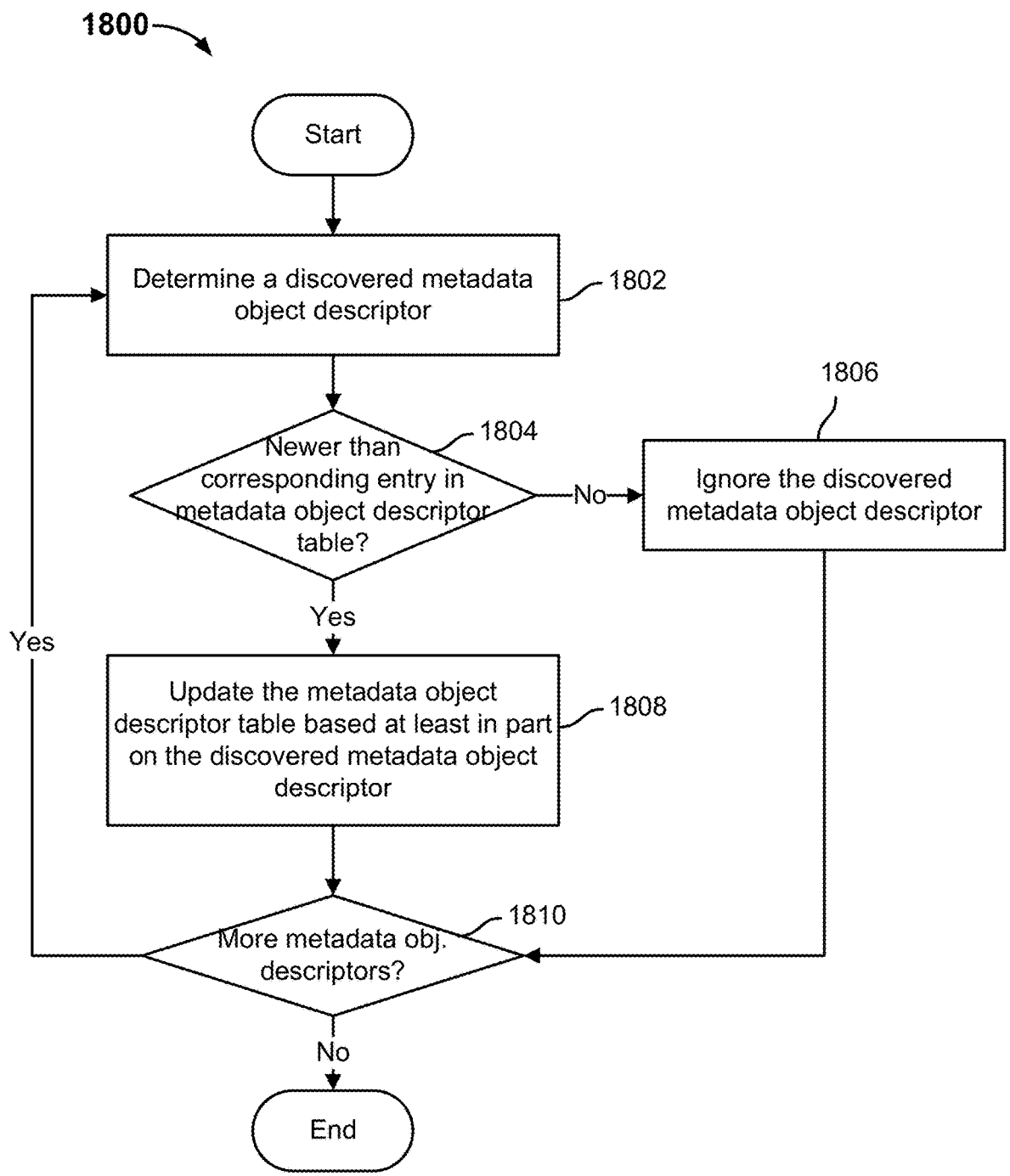
FIG. 18 is a flow diagram showing an example of a process for updating a metadata object descriptor table during a recovery process.

At 1516, the parsed read data and the parsed metadata summaries are used to generate a data structure associated with a set of references in persistent storage at which metadata is stored. The FLOG_TYPE_PTE KFC objects associated with PTEs can be used to rebuild the Page Table (the metadata object descriptor table) in the memory. As mentioned above, the KFC objects may be stale relative to the actual metadata objects stored at a seglet. As such, in various embodiments, entries in the Page Table that are generated based on the retrieved KFC objects may be replaced/overrode/updated by the metadata data descriptors found in the parsed metadata summaries that are associated with newer versions of the corresponding metadata objects. As mentioned before, reading the metadata summaries section of a seglet is sufficient to determine the metadata objects stored in the seglet without needing to read the actual metadata objects stored in the seglet. FIG. 18, below, shows an example of updating a Page Table that is being rebuilt from checkpointed KFC objects with discovered descriptors of metadata objects.

In some embodiments, if other types of KFC objects were also retrieved, including FLOG_TYPE_LOG_ENTRY and/or FLOG_TYPE_SEGMENT_MAP, then a Transactional Log Tree and/or a Segment Map can be rebuilt in memory as well and similarly updated with metadata object descriptors found in the parsed metadata summaries.

Figure 17:
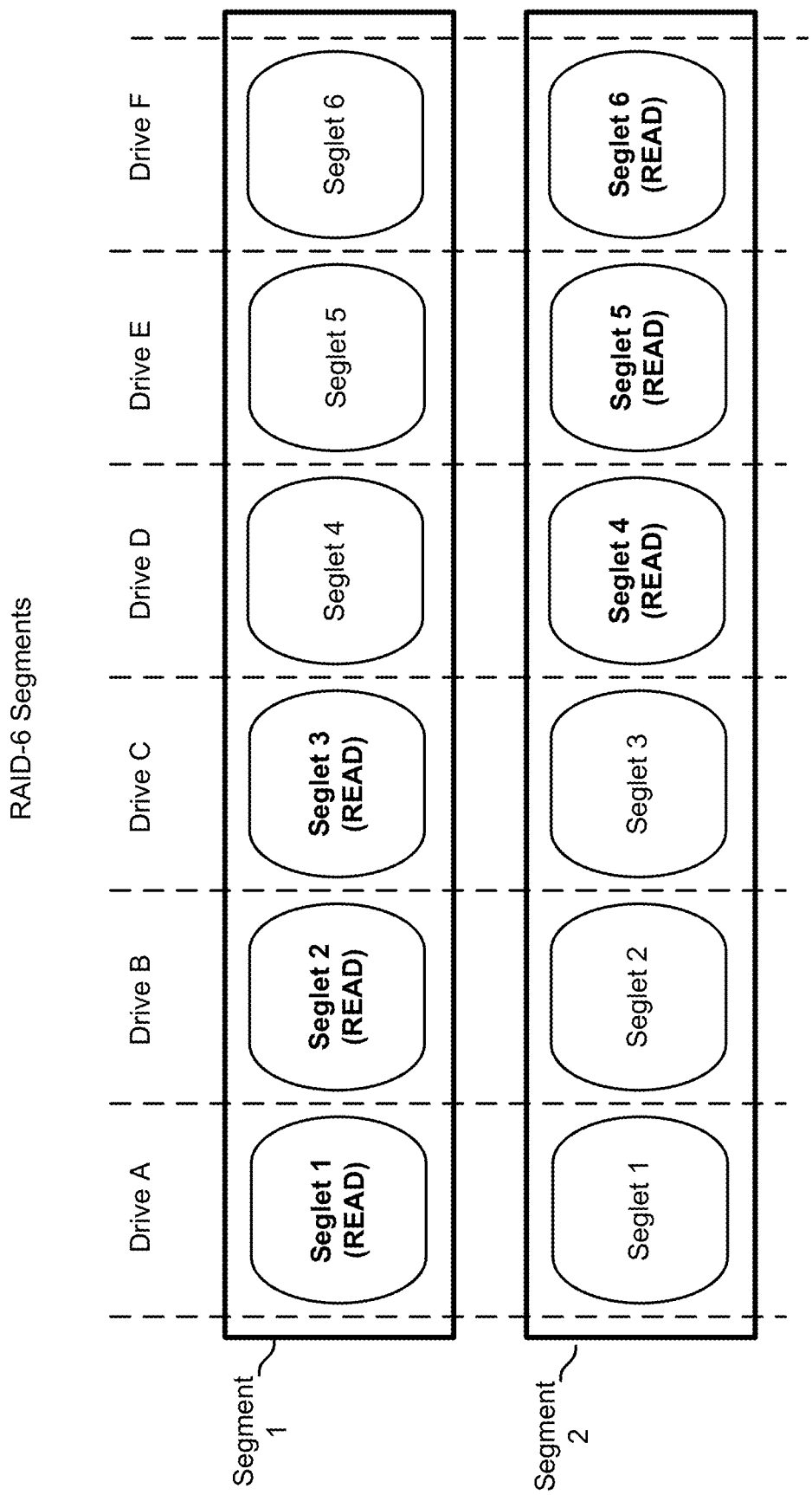
FIG. 17 is a diagram showing reading of seglets of two RAID-6 segments in parallel.

FIG. 17 is a diagram showing reading of seglets of two RAID-6 segments in parallel. In some embodiments, where the persistent storage comprises SSD (e.g., flash) storage that is arranged in a RAID configuration, to distribute the I/O workload across multiple drives uniformly, when seglets from multiple segments are read in parallel, seglets from different segments are read from different drives. As shown in the example of FIG. 17, segment 1 and segment 2 are being read from in parallel (e.g., during a recovery process where checkpointed metadata state data is retrieved from segments to which it was written). Each of segment 1 and segment 2 includes six seglets (seglet 1, seglet 2, seglet 3, seglet 4, seglet 5, and seglet 6), each of which is stored on a corresponding drive (of drive A, drive B, drive C, drive D, drive E, and drive F). To ensure that the I/O workload is spread evenly across drive A, drive B, drive C, drive D, drive E, and drive F, if three seglets are to be read in parallel for each segment, then as shown in FIG. 17, seglets for segment 1 can read from drives A, B, and C while seglets for segment 2 can be read from drives D, E, and F. As such, all six drives are utilized in performing parallel reads for segment 1 and segment 2 but the workload for each drive is relatively equal.

FIG. 18 is a flow diagram showing an example of a process for updating a metadata object descriptor table during a recovery process. In some embodiments, process 1800 is implemented at a storage system such as storage system 102 of system 100 of FIG. 1. In some embodiments, step 1516 of process 1500 of FIG. 15 may be implemented at least in part by process 1800.

Process 1800 describes an example process of updating entries in a metadata object descriptor table (Page Table) being rebuilt from KFC objects read from segments with discovered metadata object descriptors that are associated with newer versions of the same metadata objects.

At 1802, a discovered metadata object descriptor is determined. As described in example process 1500 of FIG. 15, during a recovery process, the metadata summaries section is read from each seglet of a segment that stores KFC objects. Not only can the metadata summaries section be used to locate the locations of the KFC objects stored at the seglets, but the metadata summaries section can also be used to discover metadata object descriptors of metadata objects that are also stored at the seglets. Each metadata object descriptor may include an identifier of a metadata object/page (e.g., a page ID), a location of the metadata object/page in the seglet, and a version identifier associated with that metadata object/page.

At 1804, it is determined whether the discovered metadata object descriptor is associated with a newer version of a metadata object than a corresponding entry in a metadata object descriptor table. In the event that it is determined that the discovered metadata object descriptor is associated with a newer version of a metadata object than the corresponding entry in the metadata object descriptor table, control is transferred to step 1808. Otherwise, in the event that it is determined that the discovered metadata object descriptor is not associated with a newer version of a metadata object than the corresponding entry in the metadata object descriptor table, control is transferred to step 1806. The KFC objects obtained from all the segments associated with the last stable checkpoint window and the current checkpoint window are used to rebuild the metadata object descriptor table in memory. A discovered metadata object descriptor can be compared against a corresponding metadata object descriptor entry in the current metadata object descriptor table in memory. The corresponding metadata object descriptor entry is a metadata object descriptor associated with the same metadata object identifier (e.g., page ID) as the discovered metadata object descriptor. The versions of the metadata object included in the current metadata object descriptor entry and the discovered metadata object descriptor are compared. If the version of the metadata object of the discovered metadata object descriptor is not newer than the version of the metadata object associated with the corresponding metadata object descriptor that is currently in the metadata object descriptor table, then the discovered metadata object descriptor is ignored at step 1806. If the version of the metadata object of the discovered metadata object descriptor is newer than the version of the metadata object associated with the corresponding metadata object descriptor that is currently in the metadata object descriptor table, then the current entry in the metadata object descriptor table is updated at 1808.

At 1808, the metadata object descriptor table is updated based at least in part on the discovered metadata object descriptor. The current entry in the metadata object descriptor table is updated with the location of the metadata object/page in the seglet and the newer version identifier associated with that metadata object/page that are included in the discovered metadata object descriptor. Put another way, a new version of a metadata object/page discovered in a seglet always overrides any information about the metadata object/page discovered through a PTE included in a KFC object. In some cases, a garbage collection process might move an old version of a PTE.

At 1810, it is determined whether there is at least one more metadata object descriptor to potentially discover. In the event that it is determined that there is at least one more metadata object descriptor to potentially discover, control is returned to 1802. Otherwise, in the event that it is determined that there is not at least one more metadata object descriptor to potentially discover, process 1800 ends. For example, there could be at least one more metadata object descriptor to potentially discover if it is determined that there are remaining metadata summaries sections that have not yet been parsed.

While process 1800 describes updating entries in a metadata object descriptor table (Page Table), checkpointed data associated with a Transactional Log Tree and a Segment Map can be similarly updated with discovered objects. For example, log records are immutable, so the only way we get multiple versions of the log record is if a garbage collection process moves things around. If we read a Log Entry and then the actual log record, the actual copy of the log record overrides the Log Entry information read, which will give us most accurate flogAddr for that log record. All the logs discovered with LSN less than a truncation point are discarded. For example, for all the segments scanned, we build a logical to physical mapping. Whenever we discover the FLOG_TYPE_SEGMENT_MAP object, we populate the segment map for the rest of the segment mappings which were not populated because we did not scan those segments during recovery.

In some embodiments, each of the PTE, log entry, and segment map entry includes a Checkpoint ID, and the objects which have a checkpoint ID that is less than the last stable checkpoint ID are discarded, even if a garbage collection process had moved those objects into a stable or the current checkpoint window. Also, an object from the current checkpoint window overrides the object discovered in the last stable checkpoint window. Furthermore, an object with a higher checkpoint ID window overrides the object discovered with a lower checkpoint ID window.

In some embodiments, a constant controlled throughput at which the checkpointing thread would write out the PTEs, log entries, and segment map entries is implemented. However, in some embodiments, the throughput can be made variable depending upon the current load on the persistent storage. The variability of the throughput depends on at least the following factors:

1) A lower bound on the number of objects written by the checkpoint module, so that we have a deterministic number of segments to scan on startup.

2) Space Overhead for checkpoint metadata is less than 1% of total flash on the system.

In some embodiments, the entirety of the last stable checkpoint window and the current checkpoint window are scanned in order to guarantee that all the metadata objects are discovered. In some embodiments, an optimization would be that, whenever a new PTE is written to a storage unit, a process (e.g., hardCommitCallback) discards the old copy of the PTE from the stable checkpoint window, and thus shrinks the scan window.

In some embodiments, a simple scheme is to let a garbage collection process garbage collect the PTEs from the last stable checkpoint window only if the newer PTEs for the same page ID were written in the current checkpoint window. This might reduce the number of segments being scanned.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an indication to perform a filesystem startup;
identify a last persisted storage unit in a current checkpoint window using a updated storage unit data structure that identifies a sequence in which storage units were updated at the system;
read a first data value from the last persisted storage unit to determine a first head storage unit of a last stable checkpoint window;
read a second data value from the last persisted storage unit to determine a second head storage unit of the current checkpoint window;
identify a first plurality of storage units associated with the last stable checkpoint window using the first data value, wherein the last stable checkpoint window comprises a predetermined number of storage units associated with a checkpoint window;
identify a second plurality of storage units associated with the current checkpoint window using the second data value, wherein the current checkpoint window comprises up to the predetermined number of storage units associated with the checkpoint window;
read data from the first plurality of storage units and the second plurality of storage units; and
generate a checkpointed data structure based at least in part on the read data; and a memory coupled to the processor and configured to store the data structure.

2. The system of claim 1, wherein the checkpointed data structure is associated with a set of references to locations in a persistent storage at which metadata is stored.

3. The system of claim 1, wherein the processor is further configured to select a storage unit to which to checkpoint a portion of the checkpointed data structure.

4. The system of claim 3, wherein the storage unit is selected based at least in part on a receipt of a user write request to the storage unit.

5. The system of claim 3, wherein the portion of the checkpointed data structure is dynamically determined based at least in part on a size of the checkpointed data structure and the predetermined number of storage units associated with the checkpoint window, wherein the predetermined number of storage units associated with the checkpoint window is fewer than a total number of storage units associated with a persistent storage.

6. The system of claim 3, wherein the processor is further configured to checkpoint the portion of the checkpointed data structure to the storage unit, wherein the storage unit is associated with the current checkpoint window.

7. The system of claim 6, wherein the storage unit is the last persisted storage unit, and wherein the processor is further configured to write the first data value comprising a last stable checkpoint window value and the second data value comprising a current checkpoint window value to the last persisted storage unit.

8. The system of claim 1, wherein the predetermined number of storage units associated with the checkpoint window comprises a user configurable value.

9. The system of claim 1, wherein the predetermined number of storage units associated with the checkpoint window comprises a constant value that is independent of a size associated with a persistent storage.

10. The system of claim 1, wherein the first plurality of storage units and the second plurality of storage units are included in a plurality of segments, wherein data is read in parallel from a first segment and a second segment of the plurality of segments, wherein the plurality of segments is associated with a redundant array of independent disks (RAID) configuration, wherein the first segment comprises a first plurality of seglets and the second segment comprises a second plurality of seglets, wherein the data is read in parallel from the first segment and the second segment based at least in part on reading seglets from the first segment associated with a first set of storage drives and reading seglets from the second segment associated with a second set of storage drives, wherein the first set of storage drives is different from the second set of storage drives.

11. The system of claim 1, wherein the first plurality of storage units and the second plurality of storage units comprise a plurality of segments, wherein a first storage unit comprises a segment from the plurality of segments, wherein to read at least a portion of the first storage unit comprises the processor configured to:
read respective segment information and a respective metadata summary from each of a first subset of seglets from a plurality of seglets associated with the segment;
parse metadata summaries associated with the first subset of seglets to determine locations associated with a first set of stored objects; and
determine whether to read a respective metadata summary from one or more other seglets of the plurality of segments associated with the segment based at least in part on the respective segment information read from each of the first subset of seglets.

12. The system of claim 11, wherein in the event that the respective metadata summary is not to be read from the one or more other seglets of the plurality of segments associated with the segment, the processor is configured to:
read data associated with the first set of stored objects;
parse the read data associated with the first set of stored objects; and
use the parsed read data and the parsed metadata summaries to generate the checkpointed data structure.

13. The system of claim 11, wherein in the event that the respective metadata summary is to be read from the one or more other seglets of the plurality of segments associated with the segment, the processor is configured to:
read a respective metadata summary from each of a second subset of seglets from the plurality of seglets;
parse metadata summaries associated with the second subset of seglets to determine locations associated with a second set of stored objects;
read data associated with the first set of stored objects and the second set of stored objects;
parse the read data associated with the first set of stored objects and the second set of stored objects; and
use the parsed read data and the parsed metadata summaries to generate the checkpointed data structure.

14. The system of claim 13, wherein to use the parsed read data and the parsed metadata summaries to generate the checkpointed data structure comprises to update an checkpointed entry of the data structure that is generated based at least in part on the first set of stored objects using an object descriptor located in the parsed metadata summaries.

15. A method, comprising:
receiving an indication to perform a filesystem startup;
identifying a last persisted storage unit in a current checkpoint window using a updated storage unit data structure that identifies a sequence in which storage units were updated at a system;
reading a first data value from the last persisted storage unit to determine a first head storage unit of a last stable checkpoint window;
reading a second data value from the last persisted storage unit to determine a second head storage unit of the current checkpoint window;
identifying a first plurality of storage units associated with the last stable checkpoint window using the first data value, wherein the last stable checkpoint window comprises a predetermined number of storage units associated with a checkpoint window;
identifying a second plurality of storage units associated with the current checkpoint window using the second data value, wherein the current checkpoint window comprises up to the predetermined number of storage units associated with the checkpoint window;
reading data from the first plurality of storage units and the second plurality of storage units; and
generating a checkpointed data structure based at least in part on the read data.

16. The method of claim 15, further comprising selecting a storage unit to which to checkpoint a portion of the checkpointed data structure.

17. The method of claim 16, wherein the storage unit is selected based at least in part on a receipt of a user write request to the storage unit.

18. The method of claim 16, further comprising checkpointing the portion of the checkpointed data structure to the storage unit, wherein the storage unit is associated with the current checkpoint window.

19. The method of claim 15, wherein the predetermined number of storage units associated with the checkpoint window comprises a user configurable value.

20. A computer program product, the computer program product comprising a non-transitory computer readable storage medium and comprising computer instructions for:
receiving an indication to perform a filesystem startup;
identifying a last persisted storage unit in a current checkpoint window using a updated storage unit data structure that identifies a sequence in which storage units were updated at a system;
reading a first data value from the last persisted storage unit to determine a first head storage unit of a last stable checkpoint window;
reading a second data value from the last persisted storage unit to determine a second head storage unit of the current checkpoint window;
identifying a first plurality of storage units associated with the last stable checkpoint window using the first data value, wherein the last stable checkpoint window comprises a predetermined number of storage units associated with a checkpoint window;
identifying a second plurality of storage units associated with the current checkpoint window using the second data value, wherein the current checkpoint window comprises up to the predetermined number of storage units associated with the checkpoint window;
reading data from the first plurality of storage units and the second plurality of storage units; and
generating a checkpointed data structure based at least in part on the read data.

* * * * *